(12) United States Patent
Ishii et al.

(10) Patent No.: US 9,437,856 B2
(45) Date of Patent: Sep. 6, 2016

(54) SECONDARY BATTERY POROUS MEMBRANE, SLURRY FOR SECONDARY BATTERY POROUS MEMBRANE, AND SECONDARY BATTERY

(75) Inventors: Takuya Ishii, Yokohama (JP); Takuya Kaneda, Kawasaki (JP)

(73) Assignee: ZEON CORPORATION, Tokyo (JP)

( * ) Notice: Subject to any disclaimer, the term of this patent is extended or adjusted under 35 U.S.C. 154(b) by 220 days.

(21) Appl. No.: 13/882,029

(22) PCT Filed: Oct. 28, 2011

(86) PCT No.: PCT/JP2011/074947
§ 371 (c)(1),
(2), (4) Date: Jun. 25, 2013

(87) PCT Pub. No.: WO2012/057324
PCT Pub. Date: May 3, 2012

(65) Prior Publication Data
US 2013/0266873 A1    Oct. 10, 2013

(30) Foreign Application Priority Data

Oct. 28, 2010   (JP) .................................. 2010-242274
Nov. 30, 2010   (JP) .................................. 2010-267268

(51) Int. Cl.
H01M 2/14       (2006.01)
H01M 2/16       (2006.01)

(52) U.S. Cl.
CPC ........... H01M 2/1653 (2013.01); H01M 2/145 (2013.01); H01M 2/1686 (2013.01)

(58) Field of Classification Search
CPC .. H01M 2/16; H01M 2/1653; H01M 2/1686; H01M 2/145
See application file for complete search history.

(56) References Cited

U.S. PATENT DOCUMENTS

| 2002/0071915 A1* | 6/2002 | Schubert ............... H01M 2/145 |
| | | 427/385.5 |
| 2009/0011318 A1* | 1/2009 | Sasaki et al. .................... 429/36 |
| 2011/0318630 A1* | 12/2011 | Wakizaka et al. ............ 429/144 |

FOREIGN PATENT DOCUMENTS

| JP | 11-111268 A | 4/1999 | |
| JP | 2005-353584 A | 12/2005 | |
| JP | 2007-503517 A | 2/2007 | |
| JP | 2007-173047 A | 7/2007 | |
| JP | 2008-186722 A | 8/2008 | |
| WO | WO-2009/054987 A1 * | 4/2009 | ............. H01M 4/04 |
| WO | WO 2010/074202 A1 | 7/2010 | |
| WO | WO-2010/074202 A1 * | 7/2010 | ............. H01M 2/16 |

OTHER PUBLICATIONS

International Preliminary Report on Patentability (Forms PCT/ISA/237; PCT/IB/373; PCT/IB/338) for PCT/JP2011/074947 dated Jan. 10, 2012.

* cited by examiner

*Primary Examiner* — Kenneth Douyette
(74) *Attorney, Agent, or Firm* — Birch, Stewart, Kolasch & Birch, LLP

(57) ABSTRACT

To provide a secondary battery porous membrane that has superior heat resistance and flexibility and contributes to improvements in battery cycle characteristics. Also provided is a secondary battery having high cycle characteristics that uses this porous membrane. [Solution] This secondary battery porous membrane contains nonconductive particles and a binder. The binder is characterized by being formed from a polymer containing a nitrile group, a novel group, and a $C_{4+}$ straight-chain alkylene structural unit in the same molecule and the nitrile group content in the polymer constituting the binder being 1-25% by mass, with the iodine value of the polymer being 0 mg/100 mg-30 mg/100 mg.

15 Claims, No Drawings

SECONDARY BATTERY POROUS MEMBRANE, SLURRY FOR SECONDARY BATTERY POROUS MEMBRANE, AND SECONDARY BATTERY

TECHNICAL FIELD

The present invention relates to a porous membrane, and further specifically, the present invention relates to the secondary battery porous membrane formed on electrodes of the secondary battery such as lithium ion secondary battery or nickel-metal hydride secondary battery or on the surface of the separator, and capable of having an excellent heat resistance, a flexibility, an adhesiveness thereby contributing to improve the cycle characteristic of the battery. Also, the present invention relates to a slurry for the secondary battery porous membrane for forming said porous membrane, and a lithium ion secondary battery provided with said porous membrane, and further relates to the secondary battery provided with either one or both of the said electrodes and separator.

BACKGROUND ART

Among the battery which has been practically used, the lithium ion secondary battery exhibits the highest energy density, and particularly, it is widely used for the compact electronics. Also, it is expected to be used in the automobile in addition to the compact use. Under such condition, the lithium ion secondary battery is demanded to have further long lifetime, and further improved safety.

The lithium ion secondary battery is provided with positive electrodes and negative electrodes including the active material layer (hereinbelow, it may be referred as "the electrode active material layer") generally supported at current collector, a separator, and a nonelectrolyte solution. The active material layer includes electrode active materials and a binder. The electrode is produced by forming the active material layer by coating the slurry mixture including the electrode active material in a powder form onto the current collector. Also, as the separator which separates the positive electrode and the negative electrode, a very thin separator having the thickness of 10 to 50 μm or so is used. Particularly, as the separator of the lithium ion secondary battery; an organic separator of a polyolefin such as polyethylene, polypropylene or so may be used. The polyolefin organic separator has a physical property which melts at 200° C. or less. Thus in case the battery becomes very high temperature unexpectedly due to the stimulus form inside or outside, the volume change such as shrinking or melting may take place, and as a result, the short circuit at the positive electrode and the negative electrode may take place. Also, the lithium ion secondary battery is produced by going through the stacking step of the electrode and the separator, and the cutting step wherein the electrode is cut into predetermined shape. However, while going through these production steps, the active material is released from the active material layer, and a part of the released active material may be included in the battery as the foreign matter.

In order to prevent the short circuit caused by such unexpected high temperature or by the foreign matter, it is proposed to stack a layer (the porous membrane) comprising an inorganic particle or non-conductive particle such as resin particle having high heat resistance on the electrode (the positive electrode or the negative electrode) or on the polyolefin organic separator.

For example, in the patent article 1 (JP Patent Application Laid Open No. 2005-327680), the porous membrane is formed by coating the paste including the rubber particle having acrylonitrile group as the binder, and the alumina particle which is an non-conductive inorganic oxides as the filler, to the electrode. By providing such porous membrane, the active material is prevented from being released during the production steps of the battery, and thus the short circuit is prevented from occurring while the battery is operating. Further, since the porous membrane is porous, the electrolytic solution permeates into the porous membrane, thus the battery reaction is not interfered.

PRIOR ART DOCUMENT

Patent document 1: JP Patent Application Laid Open No. 2005-327680

SUMMARY OF THE INVENTION

Technical Problems to be Solved by the Invention

However, under the condition that the environment in which the secondary battery used has become diverse such as the use of the secondary battery under high temperature or so, the secondary battery is demanded to have higher heat resistance and the longer lifetime characteristics. In order to improve the heat resistance and the long lifetime characteristics, it is thought to be necessary to improve the dispersibility of the filler, also to strengthen the binding property between the fillers and between the filler and the substrate.

According to the examination of the present inventors, for the porous membrane as set forth in the patent article 1, the adhesiveness between the fillers, and the dispersibility of the filler tends to be insufficient, as a result, the even porous membrane was not able to obtain, and a part of the filler fell off (powder fall off) from the porous membrane.

In view of such situation, the object of the present invention is to provide the secondary battery porous membrane which can contribute to improve the cycle characteristic of the battery and having excellent heat resistance, flexibility and adhesiveness; and to provide the secondary battery comprising the high cycle characteristic by using said porous membrane.

As a result of keen examination by the present inventor in view of such object, it was found that by introducing a non-polar linear alkylene structural unit, and monomer unit comprising a polar nitrile group into the polymer constituting the binder, the dispersibility of the filler (non-conductive particle) in the slurry for forming the porous membrane improves, and further by introducing the monomer unit comprising the hydrophilic group in the polymer constituting the binder, the adhesiveness between the non-conductive particles, and between the non-conductive particle and the substrate is improved. Also, by setting the iodine value of the polymer constituting the binder to 30 mg/100 mg or less, it was found that high antioxidation property are exhibited, and the cycle characteristic at the high temperature is improved. Further, by introducing the alkylene group having predetermined chain length or longer, it was found that the swelling property against the electrolytic solution is optimized and the battery characteristic can be improved.

Means for Solving the Technical Problems

The subject of the present invention accomplished based on the above described knowledge is as follows.

(1) A secondary battery porous membrane comprising a non-conductive particle and a binder; wherein said binder comprises a polymer including a nitrile group, a hydrophilic group and a linear alkylene structural unit having carbon atoms of 4 or more in a same molecule, and a content ratio of said nitrile group in the polymer constituting said binder is 1 to 25 wt % and an iodine value of said polymer is 0 mg/100 mg or more and 30 mg/100 mg or less.

(2) The secondary battery porous membrane as set forth in (1), wherein a content ratio of said hydrophilic group in the polymer constituting said binder is 0.05 to 10 wt %.

(3) The secondary battery porous membrane as set forth in (1) or (2), wherein a content ratio of said linear alkylene structural unit in the polymer constituting said binder is 50 to 98 wt %.

(4) The secondary battery porous membrane as set forth in any one of (1) to (3), wherein the polymer constituting said binder is hydrogenated acrylonitrile butadiene copolymer comprising said hydrophilic group.

(5) The secondary battery porous membrane a set forth in any one of (1) to (4), wherein said hydrophilic group is selected from the group consisting of a carboxylic acid group, a sulfonic acid group, a phosphoric acid group, hydroxyl group and salts thereof.

(6) The secondary battery porous membrane as set forth in any one of (1) to (5), wherein a content ratio of said non-conductive particle in a total amount of a solid portion constituting said porous membrane is 70 to 97 wt %, and a content ratio of said binder is 0.5 to 15 wt %.

(7) The secondary battery porous membrane as set forth in any one of (1) to (6), wherein an average particle size of said non-conductive particle is 0.1 to 20 μm, and a ratio of particles in terms of number within a range of an aspect ratio between 3 to 100 is 50% or more.

(8) A slurry for the secondary battery porous membrane comprising a non-conductive particle, a binder and a dispersion medium; wherein said binder comprises a polymer including a nitrile group, a hydrophilic group and a linear alkylene structural unit having carbon atoms of 4 or more in a same molecule, and a content ratio of said nitrile group in the polymer constituting said binder is 1 to 25 wt % and an iodine value of said polymer is 0 mg/100 mg or more and 30 mg/100 mg or less.

(9) A production method of the secondary battery porous membrane comprising a step of coating the slurry for the porous membrane set forth in (8) to a substrate, and a step of drying.

(10) An electrode for a secondary battery wherein an electrode active material layer including a binder for an electrode mixed layer and electrode active materials is formed by adhering to a current collector, and a surface of the electrode active layer is formed by stacking the porous membrane set forth in any one of (1) to (7).

(11) A separator for a secondary battery wherein said porous membrane set forth in any one of (1) to (7) is stacked on an organic separator.

(12) A secondary battery including a positive electrode, a negative electrode, a separator and an electrolytic solution wherein at least one of said positive electrode, said negative electrode and the separator is stacked with the porous membrane set forth in any one of (1) to (7).

Effects of the Invention

According to the present invention, the secondary battery porous membrane having excellent heat resistance, flexibility and adhesiveness, and capable of contributing to improve the cycle characteristic of the secondary battery is provided. Also, the cycle characteristic and the safety at the high temperature of the secondary battery using said porous membrane can be improved. Further, the slurry for the secondary battery porous membrane for forming said porous membrane has high dispersibility of the non-conductive particle and has excellent long term storage stability.

MODES FOR CARRYING OUT THE INVENTION

Hereinafter, the secondary battery porous membrane of the present invention, the slurry for the secondary battery porous membrane, and the secondary battery will be explained in turn.

(The Secondary Battery Porous Membrane)

The secondary battery porous membrane of the present invention (hereinbelow, it may be referred as "porous membrane") is a membrane having a porosity placed between the positive electrode and the negative electrode of the secondary battery, and it comprises binder having predetermined composition and the non-conductive particle. Also, the porous membrane can be used as the separator or by stacking on the electrode, or it can be used as the separator itself as well.

(The Binder)

The binder consists of the polymer comprising the nitrile group, the hydrophilic group, and the linear alkylene structural unit in the same molecule.

By comprising the nitrile group in the polymer constituting the binder, the dispersibility of the non-conductive particle in the slurry for forming the porous membrane improves and the slurry can be stored for a long period of time stably. As a result, the production of the uniform porous membrane becomes easy. Also, since the conductivity of the lithium ion becomes good, the internal resistance in the battery can be made small, and the output characteristic of the battery can be improved.

The content ratio of said nitrile group in the polymer constituting the binder is 1 to 25 wt %, preferably 5 to 25 wt %, and more preferably 9 to 25 wt %.

In the present invention, the hydrophilic group is a functional group which releases the proton in the aqueous solvent, and the salt wherein the proton is substituted into a cation. Specifically speaking, carboxylic acid group, sulphonic acid group, phosphoric acid group, and hydroxyl group and the salts thereof may be mentioned.

By introducing the hydrophilic group in the polymer constituting the binder, the adhesiveness between the non-conductive particles, and the adhesiveness between the non-conductive particle and the substrate can be improved, and the falling of the non-conductive particle (the powder fall off) during the production steps of the porous membrane can be reduced.

The content ratio of said hydrophilic group in the polymer constituting the binder is preferably 0.05 to 10 wt %, more preferably 0.1 to 8 wt %, and particularly preferably 1 to 6 wt %.

The carbon atoms of the linear alkylene structural unit in the polymer constituting the binder are 4 or larger, preferably 4 to 16, and more preferably 4 to 12.

By introducing the non-polar linear alkylene structural unit into the polymer constituting the binder, the dispersibility of the non-conductive particle in the slurry for forming the porous membrane is improved, and the slurry can be stored stably for a long period of time. As a result of this, the production of the uniform porous membrane becomes easy.

Also, by introducing the linear alkylene structural unit having predetermined chain length or longer, the swelling property against the electrolytic solution of the porous membrane can be modified, hence the battery characteristic can be improved.

The content ratio of the linear alkylene structural unit in the polymer constituting the binder is preferably 50 to 98 wt %, more preferably 50 to 80 wt %, and particularly preferably 50 to 70 wt %. Note that, the content ratio of the linear alkylene structural unit is, in case it is hydrogenated acrylonitrile butadiene copolymer, it can be obtained from the addition binding amount of 1,2 butadiene of the copolymer before hydrogenation is determined by NMR, and the iodine value of the copolymer after the hydrogenation.

The iodine value of the polymer constituting said binder is 0 mg/100 mg or more and 30 mg/100 mg or less, preferably 20 mg/100 mg or less and more preferably 10 mg/100 mg or less. When the iodine value exceeds 30 mg/100 mg, the stability at the oxidation potential is low due to the unsaturated bond included in the polymer, and the high temperature cycle performance of the battery is poor. Also, the lower limit of the iodine value is 0 mg/100 mg or more, preferably more than 0 mg/100 mg, more preferably 3 mg/100 mg or more, further preferably 5 mg/100 mg or more. By having the iodine value of the polymer within said range, the high membrane strength of the porous membrane and the excellent high temperature cycle performance of the battery are exhibited. The iodine value is determined in accordance with JIS K 6235; 2006.

The weight average molecular weight based on polystyrene standard of the polymer used in the present invention which is determined by the gel permeation chromatography is preferably 10,000 to 70,000, more preferably 50,000 to 500,000, and particularly preferably 100,000 to 300,000. By having the weight average molecular weight of the polymer with in the above mentioned range, the porous membrane can be flexible, and further the viscosity can be regulated so that it can be easily coated during the production of the slurry composition.

As mentioned in the above, the polymer constituting the binder includes the nitrile group, the hydrophilic group, and the linear alkylene structural unit in the same molecule. Such polymer is obtained by polymerizing the monomer which generates the monomer unit comprising the nitrile group, the monomer which generates the monomer unit comprising the hydrophilic group, and the monomer which generates the linear alkylene structural unit. Note that, the linear alkylene structural unit can be formed by adding the hydrogen after the polymer comprising the structural unit having the unsaturated bond is obtained.

Hereinafter, the production method of said polymer will be explained.

As for the monomer comprising the nitrile group, α,β-ethylene unsaturated nitrile monomer unit may be mentioned. As the α,β-ethylene unsaturated nitrile monomer forming the α,β-ethylene unsaturated nitrile monomer unit, it is not particularly limited, as long as it is α,β-ethylene unsaturated compound comprising the nitrile group, however for example, acrylonitrile; α-halogenoacrylonitrile such as α-chloroacrylonitrile, α-bromoacrylonitrile; α-alkylacrylonitrile such as methacrylonitrile or so may be mentioned. Among these, acrylonitrile and methacrylonitrile are preferable. These may be used alone or by combining plurality thereof.

The introduction of the hydrophilic group is carried out by polymerizing the monomer including carboxylic acid group, sulfonic acid group, phosphoric acid group, hydroxyl group and the salts thereof or so.

As for the monomer comprising the carboxylic group, monocarboxylic acid and the derivative thereof, the dicarboxylic acid, and the derivatives thereof or so may be mentioned. As for the monocarboxylic acid, acrylic acid, methacrylic acid, crotonic acid or so may be mentioned. As the monocarboxylic acid derivative, 2-ethylacrylic acid, isocrotonic acid, α-acetoxyacrylic acid, β-trans-aryloxyacrylate, α-chloro-β-E-methoxyacrylate, β-diaminoacrylate or so may be mentioned. As the dicarboxylic acid, maleic acid, fumaric acid, itaconic acid or so may be mentioned. As the dicarboxylic acid derivative, methylallyl maleate such as methylmaleate, dimethylmaleate, phenylmaleate, chloromaleate, dichloromaleate, fluoromaleate or so, maleate such as diphenyl maleate, nonyl maleate, decyl maleate, dodecyl maleate, octadecyl maleate, fluoroalkyl maleate or so may be mentioned. Also, as the acid unhydride of the used dicarboxylic acid and the acid unhydride generating the carboxyl group by hydrolysis; maleic unhydride, acrylic acid unhydride, methyl maleate unhydride, dimethyl maleate unhydride or so may be mentioned.

As for the monomer comprising sulfonic acid group, vinyl sulfonate, methylvinyl sulfonate, (meth)allyl sulfonate, styrene sulfonate, (meth)acrylate-2-ethyl sulfonate, 2-acryloamide-2-methylpropane sulfonate, 3-aryloxy-2-hydroxypropane sulfonate or so may be mentioned.

As for the monomer comprising the phosphoric acid group, phosphorous acid-2-(meth)acryloyloxyethyl, methyl phosphorous acid-2-(meth)acryloyloxyethyl, ethyl phosphorous acid-(meth)acryloyloxyethyl or so may be mentioned.

As for the monomer comprising the hydroxyl group, ethylene unsaturated alcohol such as (meth)allyl alcohol, 3-butene-1-ol, 5-hexene-1-ol, or so; alcanol esters of the ethylene unsaturated carboxylic acid such as acrylate-2-hydroxyethyl, acrylate-2-hydroxypropyl, methacrylate-2-hydroxyethyl, methacrylate-2-hydroxypropyl, di-2-hydroxyethylmaleate, di-4-hydroxybutylmaleate, di-2-hydroxypropy itaconate or so; esters between polyalkylene glycol and (meth)acrylate expressed by a general formula of $CH_2=CR^1—COO—(C_nH_{2n}O)_m—H$ (m is an integer of 2 to 9, n is an integer of 2 to 4, and $R^1$ is hydrogen or methyl group); mono(meth)acrylates of dihyroxyester of dicarboxylic acid such as 2-hydroxyethyl-2'-(meth)acryloyloxyphthalate, 2-hydroxyethyl-2'-(meth)acryloyloxysuccinate or so; vinyl ethers such as 2-hydroxyethylvinylether, 2-hydroxypropylvinylether; mono(meth)allyl ethers of the alkyleneglycol such as (meth)allyl-2-hydroxyethylether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, (meth)allyl-6-hydroxyhexylether or so; polyoxyalkyleneglycol(meth)monoallylethers such as diethyleneglycolmono(meth)allylether, dipropyleneglycolmono(meth)allylether or so; mono(meth)allylether of the substitutes of the halogen and the hydroxyl of (poly)alkyleneglycol such as glycerinemono(meth)allylether, (meth)allyl-2-chloro-3-hydroxypropylether, (meth)allyl-2-hydroxyl-3-chloropropylether or so; mono(meth)allylether of the polyvalent phenol and the halogen substitutes such as eugenol, isoeugenol or so; (meth)allylthioethers of alkyleneglycol such as (meth)allyl-2-hydroxyethylthioether, (meth)allyl-2-hydroxypropylthioether or so may be mentioned.

Among these, as the hydrophilic group, carboxylic acid group or sulfonic acid group are preferable since the adhesiveness to the separator or to the electrode active material layer which will be explained in the following is excellent; and it is preferably carboxylic acid group since it efficiently captures the transition metal ion which sometimes elutes from the positive electrode. Therefore, as the monomer comprising the hydrophilic group, among the above mentioned, monocarboxylic acid having carbon atoms of 5 or less comprising the carboxylic acid group such as acrylic acid, methacrylic acid or so; or dicarboxylic acid having carbon atoms of 5 or less with two carboxylic acids such as maleic acid, itaconic acid or so are preferable. Further, from the point of having high storage stability of the produced slurry, the acrylic acid or methacrylic acid are preferable.

The introduction method of the linear alkylene structural unit into the polymer is not particularly limited, however the method of introducing the conjugated diene monomer unit then adding the hydrogen thereto is easy and preferable.

As for the conjugated diene monomer forming the conjugated diene monomer unit, the conjugated diene of carbon atoms of 4 or more, for example 1,3-butadiene, isoprene, 2,3-dimethyl-1,3-substituted butadiene, 1,3-pentadiene or so may be mentioned. Among these, 1,3-butadiene is preferable. These may be used alone or by combining plurality thereof.

Also, other than the above mentioned monomer unit, the polymer used in the present invention may comprise other monomer unit copolymerizble with the monomer forming these monomer unit. The content ratio of such other monomer unit is, with respect to entire monomer unit, preferably 30 wt % or less, more preferably 20 wt % or less, further preferably 10 wt % or less.

As for such other monomer capable of copolymerizing, for example, aromatic vinyl compound such as styrene, α-methylstyrene, vinylstyrene or so; fluorine containing vinyl compound such as fluoroethylvinyl ether, fluoropropylvinylether, o-trifluoromethylstyrene, pentafluorovinylbenzoate, difluoroethylene, tetrafluoroethylene or so; non-conjugating diene compound such as 1,4-pentadiene, 1,4-hexadiene, vinylnorbornene, dicyclopentadiene or so; α-olefin compound such as ethylene, propylene, 1-butene, 4-methyl-1-pentene, 1-hexene, 1-octene or so; α,β-ethylene unsaturated monocarboxylic acid alkyl ester such as methyl (meth)acrylate, ethyl(meth)acrylate, butyl(meth)acrylate, 2-ethylhexyl(meth)acrylate or so; and polyfunctional ethylene unsaturated monomer such as: monoester and diester of α,β-ethylene unsaturated polyvalent carboxylic acid such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate or so; alcoxyalkylester of α,β-ethylene unsaturated monocarboxylic acid such as methoxyethyl(meth)acrylate, methoxypropyl(meth)acrylate, butoxyethyl(meth)acrylate or so; divinylcompound such as divinyl benzene or so; di(meth) acrylate such as ethylene di(meth)acrylate, diethyleneglycoldi(meth)acrylate, ethyleneglycoldi(meth) acrylate or so; trimethacrylates such as trimethylolpropanetri(meth)acrylate or so may be mentioned, and further, the self-crosslinking compound such as N-methylol(meth) acrylic amide, N,N'-dimethylol(meth)acrylic amid or so may be mentioned.

Further, besides the above mentioned monomer component, the polymer constituting the binder used in the present invention may include monomer copolymerizable therewith. As for the monomer copolymerizable therewith, halogen atom containing monomer such as vinyl chloride, vinyliden chloride or so; vinyl esters such as vinyl acetate, vinyl propionate, vinyl lactate or so; vinylethers such as methylvinyl ether, ethylvinyl ether, butylvinyl ether or so; vinyl ketones such as methylvinyl ketone, ethylvinyl ketone, butylvinyl ketone, hexylvinyl ketone, isopropylvinyl ketone or so; heterocyclic ring containing vinyl compound such as N-vinylpyrrolidone, vinylpyridine, vinylimidazole or so may be mentioned. By copolymerizing these monomers by appropriate method using the graft polymerization, the binder having said constitution can be obtained.

The binder used in the present invention is used as a dispersed solution in which the above mentioned polymer is dispersed in the dispersing medium (water or the organic solvent) or the solution state being dissolved (hereinafter, these may be referred as "a binder dispersed solution" as a whole). In the present invention, water is preferably used as the dispersing medium since it is environmentally excellent, and also as it has fast drying speed. Also, in case of using the organic solvent as the dispersing medium, the organic solvent such as N-methylpyrrolidone (NMP) or so may be used.

In case the binder is dispersed in the dispersing medium in a particle form, the average particle size (the dispersed particle size) of the binder dispersed in a particle form is preferably 50 to 500 nm, more preferably 70 to 400 nm, and most preferably 100 to 250 nm. When the average particle size of the binder is within this range, the strength and the flexibility of the electrode strength becomes good.

In case binder is dispersed in the dispersing medium in a particle form, the solid portion concentration of the dispersed solution is usually 15 to 70 wt %, preferably 20 to 65 wt %, and more preferably 30 to 60 wt %. When the solid portion concentration is within said range, the processability during the production of the slurry for the porous membrane is good.

The glass transition temperature (Tg) of the binder used in the present invention is preferably −50 to 25° C., more preferably −45 to 15° C., and particularly preferably −40 to 5° C. By having the Tg of the binder with said range, the porous membrane of the present invention exhibits excellent strength and flexibility, thus the output characteristic of the secondary battery using the porous membrane can be improved. Note that, the glass transition temperature of the binder can be controlled by combining various monomers.

The production method of the polymer which is a the binder used in the present invention is not particularly limited, and any method of a solution polymerization method, a suspension polymerization method, a bulk polymerization method, and a emulsion polymerization method or so can be used. As for the polymerization reaction, any of an ionic polymerization, a radical polymerization, a living radical polymerization, or so can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

In case of forming the linear alkylene structural unit by adding the hydrogen after the introduction of the polymerization unit derived from the conjugated diene monomer, the method of hydrogenation is not particularly limited, and usual methods can be used. For example, the reaction may be carried out by contacting the hydrogen gas with organic medium solution of the polymer including the polymer unit derived from the conjugated diene monomer under the presence of the hydrogenation catalyst such as Raney nickel, titanocenes compound, aluminum supporting nickel catalyst or so. Also, in case of producing the polymer including the polymer unit derived from the conjugated diene monomer by the emulsion polymerization, the reaction can be carried out by contacting with the hydrogen gas while under the aqueous emulsion state by adding the hydrogenation catalyst such as palladium acetate to the polymerization reaction solution. Due to the hydrogenation reaction, the iodine value of the polymer including the polymer unit derived from the conjugated diene monomer used in the present invention can be within above mentioned range. The polymer as the binder used in the present invention, hydrogenated acrylonitrile butadiene copolymer (hereinafter, it may be referred as "hydrogenated NBR") comprising the hydrophilic group is preferable.

The method of carrying out the hydrogenation by dividing into two steps or more is particularly preferable. Even when using the same amount of the hydrogenation catalyst, by carrying out the hydrogenation by dividing into two or more steps, the hydrogenation efficiency can be enhanced. That is, when adding the polymer unit derived from the conjugated diene monomer to the linear alkylene structural unit, the iodine value can be made low.

Also, in case of carrying out the hydrogenation by dividing into two steps, it is preferable to attain the hydrogenation of 50% or more, and more preferably 70% or more by the hydrogenation rate (the hydrogenation rate) (%) of the first step. That is, when the value obtained from the below equation is hydrogenation rate (%), this value is preferably 50% or more, and more preferably 70% or more.

The hydrogenation rate(%)=100×(the amount of the carbon carbon double bond before the hydrogenation−the amount of the carbon carbon double bond after the hydrogenation)/(the amount of the carbon carbon double bond before the hydrogenation)

Note that, the amount of the carbon carbon double bond can be analyzed by NMR.

The hydrogenation catalyst is the hydrogenation catalyst comprising platinum group elements (ruthenium, rhodium, palladium, osmium, iridium, and platinum). As for the hydrogenation catalyst, from the point of the catalyst activity and easiness to obtain, palladium compound and rhodium compound are preferable, and palladium compound is more preferable. Also, two or more of the platinum group element compounds can be used together, and even in such case, it is preferable to have the palladium compound as the main catalyst component. As specific examples, palladium salt of the carboxylic acid such as formic acid, acetic acid, propionic acid, lauric acid, succinic acid, oleic acid, stearic acid, futaric acid, benzoic acid or so; palladium chlorides such as palladium chloride, dichloro(cyclooctadiene)palladium, dichloro(norbornadiene)palladium, dichloro(benzonitrile)palladium, dichlorobis(triphenylphosphine)palladium, hexachloropalladium(IV)acid ammonium or so; iodine compound such as palladium iodide; palladium sulfate dihydride or so may be mentioned. Among these, palladium salt of the carboxylic acid, dichloro(norbornadiene)palladium, hexachloroplladium(IV)acid ammonium or so are preferable. The used amount of the hydrogenation catalyst can be determined accordingly, and per polymer weight, it is preferably 5 to 6,000 ppm, and more preferably 10 to 4,000 ppm.

The reaction temperature during the hydrogenation is 0 to 300° C., and preferably 20 to 150° C. Also, the hydrogen pressure is 0.1 to 30 MPa, preferably 0.5 to 20 MPa, and more preferably 1 to 10 MPa. The reaction time of the hydrogenation is determined depending on the reaction temperature, the hydrogen pressure, and the target hydrogenation rate; however it is preferably 1 to 10 hours.

After finishing the hydrogenation reaction, the hydrogenation catalyst is removed from the dispersed solution. as for such method, for example, the method of absorbing the hydrogenation catalyst by adding the absorbent such as activated carbon, and ion exchange resin or so while stirring, and then by filtering or centrifuging the latex can be applied. It is also possible to leave in the latex without removing the hydrogenating catalyst.

The binder used in the present invention is preferably obtained in the production steps of the binder, through the particle form metals removing step which removes the metal of the particle form included in the binder dispersed solution. As the content of the particle form metal component included in the binder is 10 ppm or less, the metal ion crosslinking is prevented which occurs over time between the polymer in the slurry for the porous membrane described in below, thus the viscosity is prevented from increasing. Further, the internal short circuit of the secondary battery and the self-discharge increase due to the elution and precipitation are low, thus the cycle characteristic and the safety of the battery are improved.

The method of removing the metal component of the particle form from the binder dispersed solution during said particle form metal removing step is not particularly limited, and for example, the method of removing by filtration using the filter, the method of removing by vibrating strainer, the method of removing by centrifuging, the method or removing by the magnetic force or so may be mentioned. Among these, since the target to be removed is the metal component, it is preferable to use the method of removing by the magnetic force. As the method of removing by the magnetic force, it is not particularly limited as long as it is a method capable of removing the metal component, however considering the productivity and the removal efficiency; it is preferably carried out by placing the magnetic filer in the production line of the binder.

In the production steps of the binder used in the present invention, the dispersant used in the above mentioned polymerization method may be the method used in the usual preparation, and specifically, benzenesulfonate salts such as sodium dodecylbenzenesulfonate, sodium dodecylphenylethersulfonate or so; alkyl sulfate salts such as sodium laurylsulfate, sodium tetradodecylsulfate or so; sulfosuccinate salts such as sodium dioctylsulfosuccinate, sodium dihexylsulfosuccinate or so; fatty acid salts such as sodium laurate; ethoxysulfate salts such as sodium polyoxyethylenelaurylethersulfate, sodium polyoxyethylenenonylphenylethersulfate; alkanesulfate salts; sodium alkyletherphosphoric acid ester salts; non-ionic emulsifiers such as polyoxyethylenenonylphenylether, polyoxyethylenesolbitanlaurylester, polyoxyethylene-polyoxypropylene block copolymer or so; gelatin, maleic acid unhydride-styrene copolymer, polyvinylpyrrolidone, polysodiumacrylate, aqueous polymer such as polyvinylalcohol having polymerization degree of 700 or more, and saponification degree of 75% or more may be mentioned; and these may be used alone or by combining two or more thereof. Among these, preferably it is benzene sulfonate salts such as sodium dodecylbenzenesulfonate, sodium dodecylphenylethersulfonate; alkyl sulfates such as sodium lauryl sulfate, sodium tetradodecylsulfate; and more preferably it is benzene sulfonate salts such as sodium dodecylbenzenesulfonate, sodium tetradodecylsulfonate, from the point of excellent oxidation resistance. The added amount of the dispersant can be determined accordingly, and it is usually 0.01 to 10 parts by weight or so with respect to 100 parts by weight of the total amount of the monomer.

The pH while the binder used in the present invention is dispersed in the dispersing medium is preferably 5 to 13, more preferably 5 to 12, and most preferably 10 to 12. When the pH of the binder is within said range, the storage stability of the binder improves, and moreover the mechanical stability is improved.

The pH modifier which modifies the pH of the binder may be, hydroxides such as alkaline metal hydroxides such as lithium hydroxide, sodium hydroxide, potassium hydroxide, alkaline earth metal oxides such as calcium hydroxide, magnesium hydroxide, barium hydroxide, and hydroxides of the metal which belongs to IIIA group in the long form periodic table such as aluminum hydroxide; carbonate salts such as alkaline metal carbonate salts such as sodium carbonate, potassium carbonate, and alkaline earth metal carbonate salts such as magnesium carbonate or so may be mentioned. As for the organic amine, alkyl amines such as ethyl amine, diethyl amine, propyl amine or so; alcohol amines such as monomethanol amine, monoethanol amine, monopropanol amine or so; ammoniums such as aqueous ammonia or so may be mentioned. Among these, the alkaline metal hydroxides are preferable from the point of binding property and the handling property, and more preferably it is sodium hydroxide, potassium hydroxide, and lithium hydroxide.

The content ratio of the binder of the porous membrane is preferably 0.5 to 15 wt %, more preferably 5 to 15 wt %, and particularly preferably 8 to 15 wt %. By having the content ratio of the binder of the porous membrane within the above mentioned range, the non-conductive particles, which will be explained in the following, are prevented from falling off from the porous membrane of the present invention, and the flexibility of the porous membrane is improved, thus the cycle characteristic of the secondary battery using the porous membrane can be improved.

(The Non-Conductive Particle)

The non-conductive particles used in the present invention are demanded to be stably present under the used condition of the secondary battery (the lithium ion secondary battery or the nickel-hydrogen secondary battery), and also demanded to be electrochemically stable. As the non-conductive particles, for example various inorganic particles and organic particles can be used. The organic particles are preferable from the point that the particles having less metal contamination (hereinafter, it may be referred as "metal foreign matter") which has bad influences to the battery performance can be produced inexpensively.

As the inorganic particles, oxides particles such as aluminum oxide, silicon oxide, magnesium oxide, titanium oxide, $BaTiO_2$, ZrO, alumina-silica composite oxide or so; nitrides particles such as aluminum nitride, boron nitride or so; covalent bonding crystalline particle such as silicone, diamonds or so; poorly soluble ion crystalline particles such as barium sulfate, calcium fluoride, barium fluoride or so; clay fine particles such as talc, montmorillonite or so may be used. If needed, these particles may be carried out with element substitution, surface treatment, solid solubilized, and also these maybe used alone or by combining two or more thereof. Among these, it is preferably oxide particles from the point of the stability in the electrolytic solution and the electric potential stability.

As the organic particles, various crosslinked polymer particles such as crosslinked poly methylmethacrylate, crosslinked polystyrene, crosslinked polydivinylbenzene, styrene-divinylbenzene copolymer crosslinked substance, polyimide, polyamide, polyamideimide, melamine resin, phenol resin, benzoguanamine-formaldehyde condensates or so; a heat resistant polymer particle such as polysulfone, polyacrylonitrile, polyaramide, polyacetal, thermoplastic polyimide or so may be mentioned. Also, the organic resin (polymer) constituting these organic particles may be mixtures of the material of the above mentioned, the modified substance, the derivatives, copolymers (random copolymer, alternating copolymer, block copolymer, graft copolymer), crosslinked substances (in case of the above mentioned heat resistant polymer).

Also, it is possible to use by allowing having the electrical insurance by carrying out the surface treatment with the non-conductive substance to the surface of the conductive metals such as carbon black, graphite, $SnO_2$, ITO and metal powders, and the fine powders of the oxides or compounds having the conductivity. These non-electroconductive particles may be used by combining two or more thereof.

In the present invention, as the non-conductive particles, it is preferable to use those having the content of the metal foreign matters is 100 ppm or less. If the non-conductive particle including many metal foreign matter or the metal ions is used, said metal foreign matters or the metal ions may elute out to the slurry for the porous membrane which will be explained in the following, and this will cause the ion crosslink with the polymer in the slurry for the porous membrane, thereby as a result of the coagulation of the slurry for the porous membrane, the porosity of the porous membrane declines. Therefore, the rate capability (the output characteristic) of the secondary battery using said porous membrane may deteriorate. As said metals, Fe, Ni, and Cr or so which easily ionize are most unpreferable to be comprised in. Therefore, as the content of the metal in the non-conductive particles, it is preferably 100 ppm or less, more preferably 50 ppm or less. The lesser the above mentioned content is, the lesser the deterioration of the battery characteristics are to take place. "the metal foreign matter" in here refers to the metal alone other than the non-conductive particles. The content of the metal foreign matter in the non-conductive particles can be measured by ICP (Inductively Coupled Plasma).

The volume average particle size (D50, hereinafter, it may be referred as "50% volume cumurative diameter") of the non-conductive particles used in the present invention is preferably 5 nm to 10 μm, more preferably 10 nm to 5 μm, and particularly preferably 100 nm to 2 μm. By setting the volume average particle size of the non-conductive particle within said range, the dispersing condition of the slurry of the porous membrane which will be explained in the following can be controlled easily, thus the porous membrane having even predetermined thickness can be easily produced. Also, as the particle filling rate in the porous membrane can be suppressed from increasing, thus the ionic conductivity in the porous membrane can be suppressed from declining. Furthermore, the porous membrane of the present invention can be made thin. By having the volume average particle size of the non-conductive particle within the range of 200 nm to 2 μm, it is preferable since the dispersion, the easiness of coating, and the control of air space are excellent.

Also, the BET specific surface area of the non-conductive particle used in the present invention is specifically preferably 0.9 to 200 $m^2/g$, and more preferably 1.5 to 150 $m^2/g$ from the point of suppressing the coagulation of the nonconductive particles and optimizing the fluidity of the slurry for the porous membrane which will be explain in the following.

In case the non-conductive particles are organic particles, it is preferable that said organic particles has a high heat resistance from the point of providing the heat resistance to the porous membrane and improving the stability of the secondary battery. Specifically, the temperature which decreases 10 wt % when heated at the temperature rising speed of 10° C./min by the thermobalance analysis is preferably 250° C. or higher, more preferably 300° C. or higher, and particularly preferably 350° C. or higher. On the other hand, the upper limit of said temperature is not particularly limited, however for example it can be 450° C. or less.

The particle size distribution (CV value) of the non-conductive particle is preferably 0.5 to 40%, more preferably 0.5 to 30%, and more preferably 0.5 to 20%. By having the particle size distribution of the non-conductive particle within said range, the predetermined air space can be maintained between the non-conductive particles, thus it is possible to suppress the increase of the resistance by interfering the movement of the lithium in the secondary battery of the present invention. Note that, the particle size distribution (CV value) of the non-conductive particle is carried out by the electromicroscopic observation of the non-conductive particles, and the particle size is measured for the particles of 200 or more, then the standard deviation of the average particle size and the particle size were determined; and the (the standard deviation of the particle size)/(the average particle size) is calculated thereby the particle size distribution is obtained. The larger the CV value is, the larger the variation of the particle size is.

The shape of the non-conductive particle used in the present invention can be a spherical shape, a needle shape, a rod shape, a spindle shape, a planer shape, a scale shape or so and it is not particularly limited; however it is preferably a spherical shape, a needle shape, a spindle shape, a planer shape and scale shape. Also, as the non-conductive particle, the porous particles can be used as well.

Particularly, by using the non-conductive particle of planer shape or the scale shape, the impact resistance and the long term lifetime characteristic of the battery improves in some case. The general materials, and the physical properties or so of the non-conductive particle of the planer shape or the scale shape are the same as the above mentioned non-conductive particle.

The average particle size of the planer shape non-conductive particle and the scale shape non-conductive particle are preferably 0.1 to 20 μm, preferably 0.2 to 15 μm, and more preferably 0.5 to 10 μm. By having the average particle size of the non-conductive particle within said range, the dispersed condition of the slurry for the porous membrane can be easily controlled, thus the porous membrane having even predetermined thickness can be easily produced. Further, the adhesiveness between the binder increases, and even when the porous membrane is rolled around, the fall off of the non-conductive particle is prevented, thus even if the porous membrane becomes thin, a sufficient safety can be attained. Also, as the particle filling rate in the porous membrane can be suppressed from increasing, the ionic conductivity in the porous membrane can be suppressed from decreasing. Further, the porous membrane of the present invention can be formed thin.

Note that, the average particle size of the non-conductive particle having the planer shape or the scale shape was determined by selecting the arbitrary 50 primary particles in the arbitrary field of vision of the SEM (the scanning electron microscope), and carrying out the image analysis, then calculating the circle equivalent diameter of each particle.

Also, in the planer shape non-conductive particle; the ratio of the particle within the range of the aspect ratio of 3 to 100 is 50% or more of the entire particle in number base; preferably the ratio of the particle within the range of the aspect ratio of 5 to 80 is 50% or more of the entire particle in number base; and further preferably the ratio of the particle within the range of the aspect ratio of 10 to 60 is 50% or more of the entire particle in number base.

Since the planer shape particle or the particle having different shape or the squamous shape within the above mentioned aspect ratio are oriented in the porous membrane, the growth of the needle shape objects such as lithium dendrite or so are prevented by the non-conductive particle, and the lithium dendrite will not penetrate through the porous membrane, hence the short circuit is prevented effectively.

Note that, in regards with the aspect ratio of the planer shape non-conductive particles or the scale shape non-conductive particle similar to the above mentioned average particle size, the arbitrary 50 primary particles in the arbitrary field of vision of the SEM (the scanning electron microscope) is selected, and the image analysis is carried out, then the aspect ratio is obtained from the long axis diameter and the short axis diameter.

The planer shape non-conductive particles or the scale shape non-conductive particles are preferably oriented so that the planar face of the non-conductive particle is approximately parallel to the face of the porous membrane; and by using such porous membrane, the short circuit of the battery can be suppressed further good. This is because, by orienting the non-conductive particle as such, the non-conductive particles are oriented so that the planar face thereof overlaps partially against each other; thus the air space (through hole) going to the one face to the another of the porous membrane is thought to be formed not in a straight line but in a bended form (that is, the tortuosity increases), thereby it prevents the lithium dendrite from penetrating through the porous membrane, and thus it is thought that the short circuit is suppressed good.

As the planer shape non-conductive particle or the scale shape non-conductive particle, above mentioned various inorganic particles or the organic particle can be used.

As the planer shape non-conductive particle or the scale shape non-conductive particle which are preferably used, various commercially available products can be mentioned, and for example "SUNLOVELY" ($SiO_2$) made by AGC Si-Tech Co., Ltd, a pulverized product of "NST-B1" ($TiO_2$) made by ISHIHARA SANGYO KAISHA, LTD, a planer shape barium sulfate "H series" and "HL series" made by SAKAI CHEMICAL INDUSTRY CO., LTD, "MICRON WHITE" (talc) made by HAYASHI KASEI Co., Ltd, "BENGEL" (BENTONITE) made by HAYASHI KASEI Co., Ltd, "BMM" or "BMT" (boehmite) made by KAWAI LIME INDUSTRY Co., Ltd, "SERASULE (the product name) BMT-B" [alumina ($Al_2O_3$)] made by KAWAI LIME INDUSTRY Co., Ltd, "Serath" (alumina) made by KINSEI MATEC CO., LTD, "Hikawa maica Z-20" (sericite) made by Hikawa Materials Co., Ltd, or so are available. In addition to these, in regards with $SiO_2$, $Al_2O_3$, $ZrO$, it may be produced by the method disclosed in JP Patent Application Laid Open No 2003-206475.

In regards with the planer shape non-conductive particle or the scale shape non-conductive particle, as mentioned in the above, has the ratio of the particle within the range of the aspect ratio of 3 to 100 is 50% or more of the entire particle in number base. The shape of other non-conductive particle which can be included by the ratio of less than 50% is not particularly limited; and it may be spherical shape; and also the aspect ratio can be less than 3 or larger than 100. Other non-conductive particles may be an organic particle or an inorganic particle. Note that, in case of using the inorganic particle as the non-conductive particle having the aspect ratio of 3 to 100, other non-conductive particle is also preferably inorganic particle, and similarly in case of using the organic particle as the non-conductive particle having the aspect ratio of 3 to 100, other non-conductive particle is preferably organic particle. As the specific examples of the organic particle and the inorganic particles which can be used as other non-conductive particles are the same as said non-conductive particle except for the aspect ratio.

The content of the non-conductive particle in the porous membrane is preferably 70 to 97 wt %, more preferably 75 to 97 wt %, and particularly preferably 80 to 97 wt %. By setting the content of the non-conductive particle in the porous membrane within the above mentioned range, the porous membrane showing the high heat stability can be obtained. Also, the release of the non-conductive particle (the powder fall off) from the porous membrane can be suppressed, thus the porous membrane showing the high strength can be obtained.

(Other Additives)

In the porous membrane of the present invention, isothiazoline based compound may be included. By comprising the isothiozoline based compound, the bacterial growth can be suppressed, thus the smell of the slurry for the porous membrane for forming said porous membrane can be prevented, and the increase of the tackiness of said slurry can be prevented, thereby excellent long term storage stability is obtained.

In the porous membrane of the present invention, chelate compounds may be included. By adding the chelate compounds, the transition metal ion can be captured which elutes into the electrolytic solution during the charge-discharge of the secondary battery using the porous membrane, hence the decline of the cycle characteristic and the safety of the secondary battery caused by the transition metal ion can be prevented.

Also, in the porous membrane, the pyrithione compounds may be included. As the pyrithione compounds are stable even at alkaline condition, by using together with the isothiazoline base compound, even under the alkaline condition, it can prolong the decay prevention effect, and as the synergistic effect, the high antibacterial effect can be obtained.

In the slurry for the porous membrane, in addition to the above mentioned component, other arbitrary component may be included. As such arbitrary component, a dispersant, a leveling agent, an antioxidant, a binder other than the above mentioned binder, a thickener, a defoaming agent, or the electrolytic solution additives comprising the function of electrolytic, solution decomposing suppressor or so may be mentioned. These are not particularly limited as long as they don't interfere the battery reaction.

As for the dispersant, anionic compounds, cationic compounds, non-ionic compounds and polymer compounds may be mentioned. The dispersant is selected depending on the non-conductive particle used. The content ratio of the dispersant in the porous membrane is preferably within the range which does not affect the battery characteristic, and specifically it is 10 wt % or less.

As the leveling agent, surfactants such as alkyl surfactants, silicone surfactants, fluorine surfactants, metal surfactants or so may be mentioned. By mixing said surfactants, the repelling which occurs during the coating of the slurry for the porous membrane of the present invention to the predetermined substrate is prevented; hence the smoothness of the electrode can be improved.

As the antioxidants, phenol compounds, hydroquinone compounds, organophosphorous compounds, sulfur compounds, phenylenediamine compounds, polymer type phenol compounds or so may be mentioned. The polymer type phenol compounds is polymer which comprise the phenol structure in the molecule, and the polymer type phenol compound having the weight average molecular weight of 200 to 1000, preferably 600 to 700 is preferably used.

As the binder other than the above mentioned binder, polytetrafluoroethylene (PTFE) which is used in the following described binder for the electrodes, polyvinylidene fluoride (PVDF), poly acrylic acid derivatives, polyacrylonitrile derivatives, soft polymer or so may be used.

As the thickener, cellulose based polymer such as carboxymethylcellulose, methylcellulose, hydroxypropylcellulose or so and the ammonium salts and alkaline metal salts thereof; (modified) poly(meth)acrylic acid and the ammonium salts and alkaline metal salts thereof; polyvinyl alcohols such as (modified) polyvinylalcohol, copolymer of acrylic acid or acrylic acid salts with vinyl alcohol, copolymer of maleic acid unhydride or maleic acid or fumaric acid with vinyl alcohol or so; polyethyleneglycol, polyethyleneoxide, polyvinylpyrrolidone, modified poly acrylic acid, oxidized starch, phosphoric acid starch, casein, various modified starch, acrylonitrile-butadiene copolymer hydrogenated products or so may be mentioned. When the used amount of the thickener is within said range, the coating property of the slurry for the porous membrane of the present invention, and the adhesiveness between the separator and the electrode active material layer which will be explained in the following and the porous membrane of the present invention are excellent. In the aforementioned, "(modified)poly" refers to "unmodified poly" or "modified poly", "(meth)acrylic" refers to "acrylic" and "methacrylic".

As the defoaming agent, metal soaps, polysiloxanes, polyethers, higher alcohols, perfluoroalkyls or so may be mentioned. By mixing the defoaming agents, the defoaming step of the binder can be shortened.

As the electrolytic solution additives, vinylenecarbonate or so used in the slurry mixture which will be explained in the following and in the electrolytic solution can be used. By mixing the electrolytic solution additives, the cycle lifetime of the battery becomes excellent.

Additionally, nano particles such as fumed silica or fumed alumina or so may be mentioned. By mixing said nano particles, thixo property of the slurry for forming the porous membrane can be controlled, and thereby the leveling property of the obtained porous membrane is improved.

The content ratio of said arbitrary component in the porous membrane is within the range which does not affect the battery characteristic, and specifically each components is 10 wt % or less, and the total of the content ratio of the arbitrary component is 40 wt % or less, more preferably 20 wt % or less. Note that, in case the total of the non-conductive particle, said predetermined binder, and the arbitrary components (note that the binder is excluded) is less than 100 wt %, then the content ratio of the binder as the arbitrary component may be increased accordingly.

(The Slurry for the Porous Membrane)

The porous membrane of the present invention is obtained by coating drying on the predetermined substrate with the slurry for the secondary battery porous membrane (slurry for the porous membrane) including above mentioned binder, a non-conductive particle, each component added depending on needs, and suitable dispersant.

The slurry for the porous membrane of the present invention is a slurry for forming the secondary battery porous membrane, and it is evenly dispersed in the above mentioned binder, the non-conductive particle as the solid portion and the dispersing medium which will be explained in the following. As the dispersing medium, it is not particularly limited as long as it can evenly disperse the solid portion (the binder, the non-conductive particle and the arbitrary component).

As the dispersing medium used for the slurry for the porous membrane, both of water and organic solvent can be used. As the organic solvent, cyclic aliphatic hydrocarbons such as cyclopentane, cyclohexane or so; aromatic hydrocarbons such as toluene, xylene, ethylbenzene or so; ketones such as acetone, ethylmethylketone, diisopropylketone, cyclohexanone, methylcyclohexane, ethylcyclohexane or so; chlorine based alphatic hydrocarbons such as methylene chloride, chloroform, tetrachloride carbon or so; esters such as ethyl acetate, butyl acetate, γ-butyrolactone, ε-caprolactone or so; acylonitriles such as acetonitrile, propionitrile or so; ethers such as tetrahydrofuran, ethyleneglycoldiethylether or so; alcohols such as methanol, ethanol, isopropanol, ethyleneglycol, ethyleneglycolmonomethylether or so; amides such as N-methylpyrrolidone, N,N-dimethylformaldehyde or so may be mentioned.

These dispersing medium may be used alone, or it may be used as a mixed solvent by combining two or more thereof. Particularly among these, the dispersing medium having excellent dispersibility of the non-conductive particle, low boiling point and high volatility is preferable as it can be removed in a short period of time and at low temperature. Specifically, acetone, toluene, cyclohexanone, cyclopentane, tetrahydrofuran, cyclohexane, xylene, water or N-methylpyrrolidone, or the mixed solvent thereof are preferable.

The solid portion concentration of the slurry for the porous membrane is not particularly limited, as long as the slurry can be coated and immersed, and has the viscosity comprising fluidity; however in general, it is 10 to 50 wt % or so.

The components other than the solid portion is the components which evaporates during the drying step, and in addition to said solvent, for example, medium which was dispersed and dissolved with the non-conductive particle and the binder when preparing and adding these, is also included.

The slurry for the porous membrane of the present invention is for forming the porous membrane of the present invention, thus the content ratio of the binder and the non-conductive particle in the entire amount of the solid portion of the slurry for the porous membrane is, obviously, as same as the already mentioned in the porous membrane of the present invention. That is, the content ratio of the binder is preferably 0.5 to 15 wt %, and the content ratio of the non-conductive particle is preferably 70 to 97 wt %.

The production method of the slurry for the porous membrane is not particularly limited, and it is obtained by mixing the above mentioned binder, the non-conductive particle, the dispersing medium and the arbitrary components added depending on the needs.

By using the above mentioned components in the present invention, regardless of the mixing method or the order of the mixing, the slurry for the porous membrane in which the non-conductive particle is highly dispersed can be obtained. The mixing device is not particular limited as long as it is a device which can evenly mix the above components, and a ball mill, a sand mill, a pigment disperser, a grinder, an ultrasonic disperser, a homogenizer, a planetary mixer or so can be used; however it is preferable to use the dispersion device such as a beads mill, a roll mill, a fill mix or so which can obtained particularly high dispersion share.

The viscosity of the slurry for the porous membrane, is preferably 10 to 10,000 mPa·s, more preferably 50 to 500 mPa·s from the point of even coating property, and the slurry stability over time. Said viscosity is a value measured by B type viscometer at 25° C., in rotational speed of 60 rpm.

(The Production Method of the Porous Membrane)

As the method for producing the porous membrane of the present invention; (I) the method of coating the slurry for the porous membrane including the above mentioned binder, the non-conductive particle, said arbitrary component and the dispersing medium on to the predetermined substrate (the positive electrode, the negative electrode or the separator), and then drying; (II) the method of immersing the above mentioned slurry for the porous membrane to the substrate (the positive electrode, the negative electrode or the separator), then drying these; (III) the method of coating the above mentioned slurry for the porous membrane on the release film and forming the membrane, then transferring the obtained porous membrane to the predetermined substrate (the positive electrode, the negative electrode or the separator), may be mentioned. Among these, the most preferable method is (I) the method of coating the slurry for the porous membrane to the substrate (the negative electrode, the positive electrode or the separator), then drying; since the thickness of the membrane can be easily controlled.

The porous membrane of the present invention is produced by the method of the above mentioned (I) to (III), and the detail of the production method will be explained in the below.

In the method of (I), the slurry for the porous membrane is coated on the predetermined substrate (the negative electrode, the positive electrode or the separator) then dried, thereby the porous membrane of the present invention is produced.

The method of coating said slurry to the substrate is not particularly limited, and for example, a doctor blade method, a reverse roll method, a direct roll method, a gravure method, a extrusion method, or a brushing method or so may be mentioned. Among these, from the point that the even porous membrane can be obtained, the gravure method is preferable.

As for the drying method, for example, the drying by warm air, hot air, or low humidified air, a vacuum drying, an irradiation of (far) infrared ray or electron beam or so may be mentioned. The drying temperature can be changed depending on the type of the solvent used. In order to completely remove the solvent; for example, in case of using the solvent having low volatility such as N-methylpyrrolidone or so, it is preferable to dry at high temperature of 120° C. or higher using the drier of ventilation type. On the other hand, in case of using the solvent having high volatility, it can be dried at low temperature of 100° C. or less. When forming the porous membrane on the separator described in the following, it is necessary to dry without causing the shrinking of the separator, hence it is preferable to dry at low temperature of 100° C. or less.

In the method of (II), the slurry for the porous membrane is immersed to the substrate (the negative electrode, the positive electrode or the separator) then dried; thereby the porous membrane of the present invention is produced. The method for immersing said slurry to the substrate is not particularly limited; and for example immersing can be carried out by dip coating using the dip coater or so. As the drying method, the drying method as same as the method of (I) described in the above can be mentioned.

In the method of (III), the slurry for the porous membrane is coated on the release film and the membrane is formed, thereby the porous membrane formed on the release film is produced. Next, the obtained porous membrane of the present invention is transferred on the substrate (the negative electrode the positive electrode or the separator); thereby the porous membrane of the present invention is produced.

As the coating method, the coating method as same as (I) may be mentioned. The method for transferring is not particularly limited.

The porous membrane obtained by the method of (I) to (III) can be carried out with an improvement of the adhesiveness between the substrate (the negative electrode, the positive electrode or the separator) and the porous membrane by pressure applying process using the metal mold press or roll press or so. Note that, at this time, if the pressure applying process is carried out excessively, the porosity of the porous membrane may be compromised, hence the pressure and the time applying the pressure is controlled suitably.

The membrane thickness of the porous membrane is not particularly limited, and it is set depending on the applied filed or the object of the use of the porous membrane; and if it is too thin an even membrane cannot be formed and if too thick, the capacity per volume (weight) in the battery declines, hence it is preferably 0.5 to 50 μm and more preferably 0.5 to 10 μm.

The porous membrane of the present invention is formed on the surface of the substrate (the positive electrode, the negative electrode or the separator), and it is particularly preferably used as the protection membrane of the electrode active material layer which will be described in the following and as the separator. The porous membrane of the present invention may be formed on any of the positive electrode, the negative electrode or the separator of the secondary battery; and it may be formed on all of the positive electrode, the negative electrode and the separator.
(The Secondary Battery)

The secondary battery of the present invention includes the positive electrode, the negative electrode, the separator and the electrolytic solution; and the above mentioned porous membrane is formed on any of the positive electrode, the negative electrode and the separator.

As for the secondary battery, the lithium ion secondary battery, the nickel hydrogen secondary battery or so may be mentioned; however the lithium ion secondary battery is preferable, since improved safety is most demanded, and the highest porous membrane introduction effect and the improved rate capability are listed as the objects. Hereinafter, the example of using the lithium ion secondary battery will be explained.
(The Positive Electrode and the Negative Electrode)

Generally, the positive electrode and the negative electrode are formed by adhering the electrode active materials which includes the electrode active material as an essential component, to the current collector.

<The Electrode Active Material>

The electrode active material used in the lithium ion secondary battery electrode only needs to be those which can insert and release the lithium ion reversibly by applying the electrical potential in the electrolytic solution, and the inorganic compound or the organic compound can be used.

The electrode active material (the positive electrode active material) for the positive electrode of the lithium ion secondary battery can be largely separated into those formed by the inorganic compound and the organic compound. As the positive electrode active material formed by the inorganic compound, transition metal oxides, composite oxides of lithium and transition metal, transition metal sulfides or so may be mentioned. As the above mentioned transition metal, Fe, Co, Ni, Mn or so may be used. As the specific examples of the inorganic compounds used in the positive electrode active materials, lithium containing composite metal oxides such as $LiCoO_2$, $LiNiO_2$, $LiMnO_2$, $LiMn_2O_4$, $LiFePO_4$, $LiFeVO_4$ or so; transition metal sulfides such as $TiS_2$, $TiS_3$, amorphous $MoS_2$ or so; transition metal oxides such as $Cu_2V_2O_3$, amorphous$V_2O$—$P_2O_5$, $MoO_3$, $V_2O_5$, $V_6O_{13}$ or so may be mentioned. These compounds may be element substituted partially. As the positive electrode active material formed by the organic compound, for example conductive polymers such as polyacetylene, poly-p-phenylene or so can be used. The iron based oxides can be used as the electrode active material covered by the carbon materials by placing the carbon source substance during the reduction firing. Also, these compounds may be element substituted partially.

The positive electrode active material for the lithium ion secondary battery may be a mixture of the above mentioned inorganic compounds and the organic compounds. The particle size of the positive electrode active materials are suitably selected in connection with the arbitrary constituting element of the battery; however from the point of improving the battery characteristics such as the rate capability, the cycle characteristic or so; the 50% volume cumulative diameter is usually 0.1 to 50 μm, and preferably 1 to 20 μm. When the 50% volume cumulative diameter is within this range, the secondary battery having large capacity of the charge and discharge can be obtained, and the handling during the production of the slurry mixture and the electrodes becomes easy. The 50% volume cumulative diameter is determined by measuring the particle size distribution by laser diffraction.

As the electrode active material (the negative active materials) for the lithium ion secondary battery negative electrode, for example carbon materials such as amorphous carbon, graphite, natural graphite, mesocarbon microbeads, pitch based carbon fiber or so, a conductive polymer compounds such as polyacene or so may be mentioned. Also, as the negative electrode active material, metals such as silicon, tin, zinc, manganese, iron, nickel or so and the alloys thereof, the oxides and sulfide salts of said metals or the alloys may be used. In addition, lithium alloy such as metallic lithium, Li—Al, Li—Bi—Cd, Li—Sn—Cd or so, lithium transition metal nitrides, silicones or so can be used. As for the electrode active material, those adhered with a conductive material on the surface using the mechanical reforming method can be used as well. The particle size of the negative electrode active materials are suitably selected in connection with the other constituting element of the battery; and from the point of improving the battery characteristics such as an initial efficiency, a rate capability, a cycle characteristic or so, the 50% volume cumulative diameter is usually 1 to 50 μm, and preferably 15 to 30 m.

<The Binder for the Active Material Layer>

In the present invention, the electrode active material layer includes, other than the electrode active materials, the binder (hereinafter, it may be referred as "the binder for the active material layer"). By including the binder for the active material layer, the binding property of the electrode active material layer in the electrode improves, and the strength against the mechanical force applied during the step of the winding of the electrode increases, further the electrode active material layer of the electrode becomes less likely to be released; thus the risk of having a short circuit caused by the released product decreases.

As the binder for the active material layer, various resin components can be used. For example, polyethylene, polytetrafluoroethylene (PTFE), polyvinyldene fluoride (PVDF), tetrafluoroethylene-hexafluoropropylene copolymer (FEP), poly acrylic acid derivatives, polyacrylonitrile derivatives or so can be used. These may be used alone, or by combining two or more thereof. Also, the binder used for the porous membrane of the present invention can also be used as the binder for the active material layer.

Further, the following shown soft polymers can also be used as the binder for the active material layer.

Acrylic based soft polymer which is a homopolymer of acrylic acid or methacrylic acid, or the copolymer between said homopolymer and monomer copolymerizable therewith, such as polybutylacrylate, polybutylmethacrylate, polyhydroxyethylmethacrylate, polyacrylicamide, polyacrylonitrile, butylacrylate.styrene copolymer, butylacrylate.acrylonitrile copolymer, butylacrylate.acrylonitrile.glycidylmethacrylate copolymer or so; isobutylene based soft polymers such as polyisobutylene, isobutylene.isoprene rubber, isobutylene.styrene copolymer or so; diene based soft polymer such as polybutadiene, polyisoprene, butadiene.styrene random copolymer, isoprene.styrene random copolymer, acrylonitrile.butadiene copolymer, acrylonitrile.butadiene.styrene copolymer, butadiene.styrene.block copolymer, styrene.butadiene.styrene.block copolymer, isoprene.styrene.block copolymer, styrene.isoprene.styrene.block copolymer or so; silicon containing soft polymers such as dimethylpolysiloxane, diphenylpolysiloxane, dihydroxypolysiloxane or so; olefin based soft polymers such as liquid polyethylene, polypropylene, poly-1-butene, ethylene.α-olefin copolymer, propylene.α-olefin copolymer, ethylene.propylene.diene copolymer (EPDM), ethylene.propylene.styrene copolymer or so; vinyl based soft polymers such as polyvinyl alcohol, polyvinyl acetate, polyvinyl stearate, vinyl acetate.styrene copolymer or so; epoxy based soft polymers such as polyethyleneoxide, polypropyleneoxide, epichlorohydrin rubber or so; fluorine containing soft polymers such as vinylidene fluoride based rubber, ethylene tetrafluoride-propylene rubber or so; other soft polymer such as natural rubber, polypeptide, protein, polyester based thermoplastic elastomer, vinyl chloride based thermoplastic elastomer, polyamide based thermoplastic elastomer or so may be mentioned. These soft polymers may comprise a crosslinking structure, or it may be those introduced with the functional group by modification.

The amount of the binder for the active material layer in the electrode active material layer is preferably 0.1 to 5 parts by weight, more preferably 0.2 to 4 parts by weight and particularly preferably 0.5 to 3 parts by weight, with respect to 100 parts by weight of the electrode active material layer. By having the amount of the binder for the active material layer in the electrode active material layer within said range, the active material is prevented from being released from the electrode without interfering the battery reaction.

The binder for the active material layer is prepared as the solution or the dispersed solution for making the electrode. The viscosity at that time is usually 1 to 300,000 mPa·s, and preferably 50 to 10,000 mPa·s. Said viscosity is a value measured when the temperature is at 25° C. and the rotational speed is at 60 rpm using the B type viscometer.

<Other Arbitrary Additives>

In the present invention, in the electrode active material layer, besides the above mentioned electrode active material and the binder for the active material layer, arbitrary additives such as conductive material or the reinforcement material or so may be comprised. As the conductive material, a conductive carbon such as acetylene black, Ketjen black, carbon black, graphite, vapor phase epitaxy carbon fiber, carbon nano tube or so can be used. The carbon powders such as graphite, fibers or foils of various metals may be mentioned. As the reinforcement material, filler of a spherical shape, a planer shape, a rod shape or a fiber shape of various inorganics and organics can be used. By using the conductive material, the electrical contact between the electrode active materials can be improved, and in case of using the lithium ion secondary battery, the discharge rate capability can be improved. The used amount of the conductive material or the reinforcement material is usually 0 to 20 parts by weight, preferably 1 to 10 parts by weight, with respect to 100 parts by weight of the electrode active material. Also, isothiozoline based compounds or chelate compounds used in the present invention may be included in the electrode active material layer.

<The Formation of the Electrode Active Material Layer>

The electrode active material layer can be formed by adhering the slurry including the electrode active material, the binder for the active material layer and the solvent (hereinafter, it may be referred as "slurry mixture") to the current collector.

As the solvent, it only needs to be those which allow the binder for the active material layer to dissolve or disperse in a particle form.

As the solvent used for the slurry mixture, either of water or the organic solvent can be used. As the organic solvents, cyclic aliphatic hydrocarbons such as cyclopentane, cyclohexane or so; aromatic hydrocarbons such as toluene, xylene or so; ketones such as ethylmethylketone, cyclohexanone or so; esters such as ethyl acetate, butyl acetate, γ-butyropropylactone, ε-caprolactone or so; acylonitriles such as acetonitrile, propionitrile or so; ethers such as tetrahydrofuran, ethyleneglycoldiethylether or so; alcohols such as methanol, ethanol, isopropanol, ethyleneglycol, ethyleneglycolmonomethylether or so; amides such as N-methylpyrrolidone, N,N-dimethylformamide or so may be mentioned. These solvents can be used alone or by mixing, depending on the drying speed and the environmental concerns.

In the slurry mixture, the additives which exhibit various functions such as thickener or so can be comprised. As the thickener, the polymer soluble in the solvent used for the slurry mixture can be used. Specifically, the thickener mentioned in the porous membrane of the present invention can be used. The used amount of the thickener is preferably 0.5 to 1.5 parts by weight with respect to 100 parts by weight of the electrode active material. When the used amount of the thickener is within said range, the coating property of the slurry mixture and the adhesiveness with the current collector are excellent.

Further, in the slurry mixture, besides the above mentioned components, in order to enhance the stability and the lifetime of the battery, trifluoropropylenecarbonate, vinylenecarbonate, catechol carbonate, 1,6-dioxaspiro[4,4]

nonane-2,7-dione, 12-crown-4-ether or so can be used. Also, these may be used by comprising the electrolytic solution which will be described in the followings.

The amount of the solvent in the slurry mixture is controlled to have suitable viscosity for coating depending on the types of the electrode active materials or the binder for the active material, and then the slurry mixture is used. Specifically, it is controlled so that the concentration of the solid portion combining the electrode active material, the binder for the active material layer and the arbitrary additives such as conductive material in the slurry mixture are preferably 30 to 90 wt %, more preferably 40 to 80 wt %.

The slurry mixture is obtained by mixing the electrode active material, the binder for the active material layer, the arbitrary additives such as conductive material which is added depending on the needs, and the solvent, by using the mixing device. The mixing may be done by supplying the above mentioned components into the mixing device at once. When using the electrode active material, the binder for the active material layer, the conductive material and the thickener as the constituting components of the slurry mixture, the conductive material and the thickener are mixed in the solvent to disperse the conductive material into a fine particle form, then the binder for the active material layer and the electrode active material are added and further mixed. By doing so, the dispersibility of the slurry improves, thus it is preferable. As the mixing machine, the ball mill, the sand mill, the pigment disperser, the grinder, the ultrasonic disperser, the homogenizer, the planetary mixer, a Hobart mixer or so can be used; however the ball mill is preferably used since the aggregation of the conductive material and the electrode active material can be suppressed.

The particle size of the slurry mixture is preferably 35 μm or less, and further preferably 25 μm or less. When the particle size of the slurry is within the above mentioned range, the dispersibility of the conductive material is high, and the uniform electrode can be obtained.

The current collector is not limited as long as it is a material having the electroconductivity and the electrochemical durability; however from the point of having the heat resistance, for example, the metal materials such as iron, copper, aluminum, nickel, stainless steel, titanium, tantalum, gold, platinum or so are preferable. Among these, as for the positive electrode of the lithium ion secondary battery, aluminum is preferable, and as the negative electrode of the lithium ion secondary battery, copper is preferable. The shape of the current collector is not particularly limited; however it is preferably a sheet form having a thickness of 0.001 to 0.5 mm or so. The current collector is preferably used by carrying out the surface roughening treatment in advance to enhance the adhesive strength of the slurry mixture. As the surface roughening method, a mechanical grinding, electrolytic grinding, chemical grinding or so may be mentioned. In the mechanical grinding, a grinding cloth with the grinding particles, grind stone, emery wheel, a wire brush equipped with a steel wire or so may be used. Also, in order to enhance the conductivity or the adhesive strength of the active material layer, an intermediate layer may be formed on the surface of the current collector.

The production method of the electrode active material layer only needs to be the method of binding the electrode active material layer to at least one side and preferably to both sides of the current collector in a layer form. For example, said slurry mixture is coated on the current collector and dried; followed by applying the heat for one hour or longer at 120° C. or higher thereby forming the electrode active material layer. The method of coating the slurry mixture to the current collector is not particularly limited. For example, it may be a doctor blade method, a dip method, a reverse roll method, a direct roll method, a gravure method, an extrusion method or a brush method or so. As for the drying method, for example, the drying by warm air, hot air, or low humidified air, a vacuum drying, an irradiation of (far) infrared ray or electron beam or so may be mentioned.

Next, by using the metal mold press or the roll press, it is preferable to lower the porosity of the electrode active material layer by the pressure applying process. The preferable porosity is 5 to 15%, more preferably 7 to 13%. If the porosity is too high, the charge efficiency or the discharge efficiency is deteriorated. If the porosity is too low, it becomes difficult to obtain high volume capacity, or a problem such as a releasing of the electrode active material layer takes place easily which then easily causes the malfunction or so. Further, when using the curable polymer, it is preferably cured.

The thickness of the electrode active material layer is, for both of the positive and the negative electrode, usually 5 to 300 μm, and more preferably 10 to 250 μm.

(The Separator)

As the separator for the lithium ion secondary battery, the known separator such as those including the polyolefin resin such as polyethylene or polypropylene or so, or the aromatic polyamide resin or so is used.

As for the separator used in the present invention, the porous membrane with fine porous diameter, having an ionic conductivity without electron conductivity, and a high resistance against the organic solvent is used; and for example, the fine porous membrane formed by the resin such as polyolefins (polyethylene, polypropylene, polybutene, polyvinyl chloride), and the mixtures thereof, or the copolymer thereof; the fine porous membrane formed of resins such as polyethylenetelephthalate, polycycloolefin, polyethersulfon, polyamide, polyimide, polyimideamide, polyalamide, polycycloolefin, nylon, polytetrafluoroethylene or so; or the weaved fibers of the polyolefins or unwoven fabrics thereof; or the bulk structure of the insulative particles or so may be mentioned. Among these, the fine porous membrane formed of the polyolefin resin is preferable since it has excellent coating property of the slurry for the porous membrane, and enables to increases the active material ratio in the battery and enables to make the thickness of the entire separator thin; thereby increases the capacity per volume.

The thickness of the separator is usually 0.5 to 40 μm, preferably 1 to 30 μm, and more preferably 1 to 10 μm. When it is within this range, the resistance caused by the separator in the battery becomes small. Also, the slurry for the porous membrane has good processing property when coating to the separator.

In the present invention, as the polyolefin resin used as the material of the separator, homopolymer, copolymer of polyethylene, polypropylene or so, and the mixtures thereof may be mentioned. As the polyethylene, polyethylene having low density, intermediate density, or high density can be mentioned, and from the point of the nail penetration strength and the mechanical strength, high density polyethylene is preferable. Also, these polyethylenes may be combined with two or more thereof in order to provide the flexibility. The polymerization catalyst used for these polyethylenes are not limited, and a Ziegler-Natta catalyst, a Phillips catalyst, or a metallocene catalyst or so may be mentioned. From the point of establishing the mechanical strength and the high permeability, the viscosity average molecular weight of polyethylene is 100,000 or more and 12,000,000 or less, and more preferably 200,000 or more and 3,000,000 or less. As polypropylene, homopolymer, random copolymer, block copolymer or so may be mentioned, and it can be used alone or by mixing two or more thereof. Also, the polymerization catalyst is not particularly limited, the Ziegler-Natta catalyst, or the metallocene catalyst or so may be mentioned. The stereoregurality is not particularly limited; and isotactic, syndiotactic, atactic can be used; however it is preferable to use isotactic polypropylene since it is inexpensive. Further, within the range which does not compromise the effect of the present invention, polyolefin may be added with suitable amount of additives such as polyolefin other than polyethylene or polypropylene, the antioxidant and nucleating agent or so.

As for the method for producing the polyolefin separator, those widely known is used, and for example, the dry method for forming the fine porous membrane in which after forming the film by melt extrusion of polypropylene or polyethylene, annealing at low temperature to grow the crystalline domain, then under such condition, stretching to stretch the amorphous area; and the wet method in which after mixing the hydrocarbon solvent or other low molecular weight material and polypropylene, polyethylene, the film is formed, then the film of which the solvent and low molecules have formed island phases on the amorphous phase is carried out with the removal of the this solvent or low molecule by using the solvent which easily evaporates, thereby forming the fine porous membrane; or so may be selected. Among these, in order to reduce the resistance, the dry method is preferable since large air spaces are easily obtained.

The separator used in the present invention may include an arbitrary filler or fibrous compounds in order to control the strength, the rigidity, and the thermal shrinkage. Also, in case of stacking the porous membrane of the present invention, in order to improve the adhesiveness between the separator and the porous membrane, and to improve the impregnating ability of the liquid by reducing the surface tension against the electrolytic solution, it may be carried out the covering treatment by low molecular compounds or polymer compounds, an electromagnetic beam treatment such as ultraviolet ray, or plasma treatment such as corona discharge plasma gas or so may be carried out. Particularly, as it is easy to obtain the high impregnating ability of the electrolytic solution and adhesiveness between said porous membrane, it is preferable to carry out the covering treatment comprising the polar group such as carboxylic acid group, hydroxyl group, and sulfonic acid group or so.

(The Electrolytic Solution)

As the electrolytic solution, the organic electrolytic solution in which the supporting electrolytes are dissolved in the organic solvent is used. As the supporting electrolyte, lithium salts are used. As lithium salts, it is not particularly limited, however $LiPF_6$, $LiAsF_6$, $LiBF_4$, $LiSbF_6$, $LiAlCl_4$, $LiClO_4$, $CF_3SO_3L_1$, $C_4F_9SO_3L_1$, $CF_3COOLi$, $(CF_3CO)_2NLi$, $(CF_3SO_2)_2NLi$, $(C_2F_5SO_2)NLi$ or so may be mentioned. Among these, $LiPF_6$, $LiClO_4$, $CF_3SO_3Li$ are preferable since it dissolves easily and exhibits high dissociation degree. The higher the dissociation degree of the supporting electrolytes are used, the higher the lithium ion conductivity is; hence the lithium ion conductivity can be regulated by the type of the supporting electrolytes.

As for the organic solvent used in the electrolytic solution, it is not particularly limited as long as it can dissolve the supporting electrolytes; however carbonates such as dimethyl carbonate (DMC), ethylene carbonate (EC), diethyl carbonate (DEC), propylene carbonate (PC), butylenes carbonate (BC), and methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be used suitably. Also, the mixture of these solvents may be used as well. Among these, the carbonate groups are preferable since it has high dielectric constant, and a wide range of a stable electrical potential range. The lower the viscosity of the used solvent is, the higher the lithium ion conductivity is; and hence the lithium ion conductivity can be regulated by the type of the solvent.

The concentration of the supporting electrolytes in the electrolytic solution is usually 1 to 30 wt %, preferably 5 to 20 wt %. Also, depending on the type of the supporting electrolytes, it is usually used in the concentration of 0.5 to 2.5 mol/L. The ionic conductivity tends to lower when the concentration of the supporting electrolytes are too low or too high. As the lower the concentration of the used electrolytic solution is, the larger the swelling degree of the polymer particle is; thus the lithium ion conductivity can be regulated by the concentration of the electrolytic solution.

(The Production Method of the Secondary Battery)

As for the specific production method of the lithium ion secondary battery, the method of stacking the negative electrode and the positive electrode against each other via the separator, and rolling or bending according to the shape of the battery to place in the battery container, then closing the battery container after the electrolyte is introduced therein may be mentioned. The porous membrane of the present invention is formed onto any one of the positive electrode, the negative electrode and the separator. The method of forming the porous membrane of the present invention onto the positive electrode, the negative electrode and the separator is as same as described in above mentioned method (I) and (II). Also, the porous membrane alone can be stacked independently on the positive electrode, the negative electrode or the separator as set forth in the above mentioned method of (III). The pressure rising inside the battery, the excessive discharge and charge can be prevented by introducing the overcurrent prevention element such as the expand metals, the fuse, PTC element or so depending on the needs. The shape of the battery may be any of a coin shape, a button shape, a sheet shape, a cylinder shape, a square shape, and a squamous shape or so.

In the secondary battery of the present invention, the porous membrane of the present invention is preferably formed on to the surface of the electrode active material layer of the positive electrode or the negative electrode. By forming the porous membrane of the present invention onto the surface of the electrode active material layer, even if the separator shrinks due to the heat, the short circuit between the positive electrode and the negative electrode does not take place; hence the high safety is maintained. In addition, by forming the porous membrane of the present invention onto the surface of the electrode active material layer, even without the separator, the porous membrane can function as the separator; the secondary battery can be produced in a low cost. Also, in case of using the separator, the hole formed on the surface of the separator will not be filled; hence higher rate capability can be exhibited.

EXAMPLES

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

<The Characteristic of the Slurry for the Porous Membrane: The Dispersibility>

The slurry for the porous membrane was inserted into the test tube having a diameter of 1 cm until it reached the height of 5 cm, and this was defined as test sample. For the measurement of each specimen, five test samples were prepared. Said test samples were placed on the table perpendicularly. The state of the slurry for the porous membrane placed were observed for 10 days, and evaluated according to the following standard. The time and days required for the five test samples to precipitate (referred as the average precipitation required time (days)), and the average precipitation required time (days) thereof was defined as the day of which the precipitation was confirmed. It indicates an excellent dispersibility such that two phase separation was not observed.

A: No two phase separation was observed even after 10 days.
B: Two phase separation observed 6 to 10 days later.
C: Two phase separation observed 2 to 5 days later.
D: Two phase separation observed a day later.
E: Two phase observation observed within 3 hours.

<The Reliability Test of the Separator with the Porous Membrane>

The separator with the porous membrane was cut into a circular shape having a diameter of 19 mm, and immersed in 3 wt % methanol of non-ionic surfactant (EMULGEN 210P made by Kao Corporation); then it was air dried. The electrolytic solution was impregnated to this circular shape separator, and placed between a pair of SUS plate (diameter of 15.5 mm), then stacked so that it was constituted as (SUS plate)/(circular shape plate)/(SUS plate). Here as the electrolytic solution, the solution in which the mixed solvent mixing ethylenecarbonate (EC), diethylcarbonate (DEC) in a EC:DEC=1:2 (the capacity ratio at 20° C.) dissolved with LiPF6 so that the concentration is 1 mol/L was used. This was introduced in to the 2032 type coin cell and sealed. The lead wire was taken from the coin cell, then placed in the oven by attaching the thermocouples. While applying the AC current at the frequency of 1 kHz and the amplitude of 10 mV, the temperature was raised to 200° C. at the temperature rising speed of 6° C./min; and the occurrence of the short circuit was checked by measuring the cell resistance. In the present test, along with the rising of the temperature, the resistance value increases and it becomes at least 1000 $\Omega/cm^2$ or more upon shut down. Then, it was defined that the short circuit had occurred when it rapidly declines to 10 $\Omega/cm^2$ or less. Note that, this test was carried out for 20 times, and it was evaluated based on the following standard. The lesser the occurrence of the short circuit is, the better the reliability is.

(The Evaluation Standard)
A: Number of the occurrence of the short circuit 0
B: Number of the occurrence of the short circuit 1
C: Number of the occurrence of the short circuit 2 to 3
D: Number of the occurrence of the short circuit 4 or more <The Reliability Test of the Electrodes with the Porous Membrane>

The separator (polypropylene separator of single layer, the porosity 55%, the thickness 25 µm, the same separator used in the example 1 as "the organic separator layer") was cut into a circular shape having the diameter of 19 mm, and immersed in 3 wt % methanol of non-ionic surfactant (EMULGEN 210P made by Kao Corporation); then it was air dried. On the other hand, the electrode of measuring object was cut into a circular shape having the diameter of 19 mm. These were impregnated with the electrolytic solution, and placed between a pair of SUS plate (diameter of 15.5 mm), then stacked so that it was constituted as (SUS plate)/(circular shape plate)/(SUS plate). The electrode of the circular shape was placed so that the face of the porous membrane side thereof was on the side of the separator. Here as the electrolytic solution, the solution in which the mixed solvent mixing ethylenecarbonate (EC), diethylcarbonate (DEC) in a EC:DEC=1:2 (the capacity ratio at 20° C.) dissolved with LiPF$_6$ so that the concentration is 1 mol/L was used. This was introduced in to the 2032 type coin cell and sealed. The lead wire was taken from the coin cell, and then placed in the oven by attaching the thermocouples. While applying the AC current at the frequency of 1 kHz and the amplitude of 10 mV, the temperature was raised to 200° C. at the temperature rising speed of 1.6° C./min; and the occurrence of the short circuit was checked by measuring the cell resistance. In the present test, along with the raising of the temperature, the resistance value increases and it becomes at least 1000 $\Omega/cm^2$ or more upon shut down. Then, it was defined that the short circuit had occurred when it rapidly declines to 10 $\Omega/cm^2$ or less. Note that, this test was carried out for 20 times, and it was evaluated based on the following standard. The lesser the occurrence of the short circuit is, the better the reliability is.

(The Evaluation Standard)
A: Number of the occurrence of the short circuit 0
B: Number of the occurrence of the short circuit 1
C: Number of the occurrence of the short circuit 2 to 3
D: Number of the occurrence of the short circuit 4 or more <The Powder Fall Off Property of the Secondary Battery Electrode (the Electrode with the Porous Membrane)>

The secondary battery electrode (the electrode with the porous membrane) was cut out into 5 cm square, and placed into 500 ml glass bottle, and then shook for 3 hours at 300 rpm by a shaker. The weight of the powder which fell off was set as "a", the weight of the secondary battery electrode before shaking was set as "b", the weight of the electrode before stacking the porous membrane was set as "c", and the weight of the powder fall off during the shaking of the electrode without stacking the porous membrane was set as "d"; and the ratio X[wt %] of the powder which fell off was calculated by the below equation and evaluated by the following standard. The smaller the ratio X of the powder fell off is, the better the powder fall off prevention effect is.

$$X=(a-b)/(b-c-a)\times 100[\text{wt \%}]$$

(The Evaluation Standard)
A: Less than 2 wt %
B: 2 wt % or more and less than 5 wt %
C: 5 wt % or more <The Powder Fall Off Property of the Secondary Battery Separator (the Organic separator with the porous membrane)>

The secondary battery electrode (the organic separator with the porous membrane) was cut out into 5 cm square, and placed into 500 ml glass bottle, and then shook for 3 hours at 300 rpm by the shaker. The weight of the secondary battery separator before shaking was set as "a", the weight of the secondary battery separator after the shaking was set as "b", and the ratio of the powder which fell off X[wt %] was calculated by the below equation and evaluated by the following standard. The smaller the ratio of the powder which fell off X is, the better the powder fall off prevention effect is.

$$X=(a-b)/a\times 100[\text{wt \%}]$$

(The Evaluation Standards)
A: Less than 1 wt %
B: 1 wt % or more and less than 3 wt %
C: 3 wt % or more and less than 5 wt %
D: 5 wt % or more and less than 10 wt %
E: 10 wt % or more and less than 15 wt %
F: 15 wt % or more
<The High Temperature Cycle Performance of the Secondary Battery>

In regards with the lithium ion secondary battery of full cell coin shape, the charge-discharge of which charged from 3V to 4.3V in 0.1 C at 60° C., and discharged from 4.3V to 3V at 0.1 C, was repeated for 50 cycles. The ratio of the 0.1 C discharge capacity of the $50^{th}$ cycle with respect to the 0.1 C discharge capacity of the $5^{th}$ cycle was calculated, then the value was defined as the capacity maintaining rate, and it was evaluated based on the following standard. The larger this value is, the smaller the discharge capacity reduction is; hence the better the high temperature characteristic is.

A: 90% or more
B: 80% or more and less than 90%
C: 70% or more and less than 80%
D: 60% or more and less than 70%
E: less than 60%
<The Measurement of the Iodine Value>

100 g of aqueous dispersion of the binder for the porous membrane was coagulated by 1 litter of methanol, and then vacuum dried over night at 60° C. The iodine value of the dried polymer was measured in accordance with JIS K6235; 2006. The smaller the iodine value is, the lesser the carbon carbon unsaturated bond is present.

(The Production of the Non-Conductive Particle)
<1-1. The Production of the Seed Polymer Particle A>

Into the reaction machine with the stirrer, 100 parts of styrene, 1.0 parts of sodium dodecylbenzenesulfonate, 100 parts of ion exchange water, and 0.5 parts of potassium persulfate were placed in, then polymerized for 8 hours at 80° C.

Thereby, the aqueous dispersion of the seed polymer particle A having the average particle size of 60 nm was obtained.

<1-2. The Production of the Seed Polymer Particle B>

Into the reaction machine with the stirrer, 2 parts in terms of solid portion of the aqueous dispersion of the seed polymer particle A which was obtained in step (1-1), 0.2 parts of sodium dodecylbenzenesulfonate, 0.5 parts of potassium persulfate, and 100 parts of ion exchange water were placed in and mixed to form the mixture A, then the temperature was raised to 80° C. On the other hand, in a different container 97 parts of styrene, 3 parts of methacrylic acid, 4 parts of t-dodecylmercaptan, 0.5 parts of sodium dodecylbenzenesulfonate, and 100 parts of ion exchange water were mixed, thereby the dispersion of the monomer mixture 1 was prepared. The dispersion of this monomer mixture 1 was polymerized by continuously adding for 4 hours into the mixture A obtained in above. The temperature of the reaction system during the continuous addition of the dispersion of the monomer mixture 1 was maintained at 80° C., and the reaction was carried out. After the continuous addition has been completed, the reaction was continued for 3 hours at 90° C. Thereby the water dispersion of the seed polymer particle B having the average particle size of 200 nm was obtained.

<1-3. The Production of the Non-Conductive Particle>

Next, to the reaction machine with the stirrer, 10 parts in terms of solid portion of the water dispersion of the seed polymer particle B obtained in the (1-2) step (that is, in terms of seed polymer particle B weight), 90 parts of the monomer mixture 2 (the mixture of divinylbenzene and ethylvinylbenzene, the monomer mixture ratio: divinylbenzene/ethylvinylbenzene=60/40, the product name: DVB-570 made by NIPPON STEEL & SUMIKIN CHEMICAL CO., LTD.), 1 part of sodium dodecylbenzenesulfonate, 5 parts of t-butylperoxy-2-ethylhexanoate as the polymerization initiator (the product name: PERBUTYL O, made by NOF CORPORATION), 200 parts of ion exchange water were placed in, and stirred for 12 hours at 35° C., thereby the monomer mixture 2 and the polymerization initiator were completely absorbed to the seed polymer particle B. Then, this was polymerized for 4 hours at 90° C. Next, the steam was introduced, thereby the unreacted monomers were removed.

Thereby, the aqueous dispersion of the non-conductive particle having the average particle size of 400 nm was obtained.

(The Production of the Binder for the Porous Membrane)
<1-4. The Production of Nitrile Rubber>

Into the autoclave with the stirrer, 240 parts of ion exchange water, 2.5 parts of sodium alkylbenzenesulfonate, 35 parts of acrylonitrile, 5 parts of methacrylic acid were placed in this order, and the inside of the bottle was substituted by nitrogen, followed by the pressure introduction of 60 parts of butadiene, then adding 0.25 parts of ammonium persulfate to carry out the polymerization of reaction at the reaction temperature of 40° C., thereby nitrile rubber L1 was obtained. The polymerization transformation rate was 85%, the iodine value was 280. Also, when the addition bonding amount of 1, 2 of butadiene of nitrile rubber L1 was measured by NMR, it was 5.4%.

<1-5. The Regulation of the Binder for the Porous Membrane>

400 ml of nitrile rubber L1 in which the entire solid portion concentration has been regulated to 12 wt % (the entire solid portion 48 g) was introduced into the 1 litter autoclave with the stirrer, and nitrogen gas was flowed in 10 minutes to remove the dissolved oxygen, then 75 mg of palladium acetate as the hydrogenation catalyst was added by dissolving in 180 ml water added with 4 times mol of nitric acid with respect to Pd. The inside of the system was carried out with substitution by the hydrogen gas, and the content of the autoclave was heated to 50° C. while the pressure was applied to 3 MPa by hydrogen gas, then the hydrogenation was carried out for 6 hours (referred as "the first step of the hydrogenation"). Here, the iodine value of nitrile rubber was 35.

Next, the autoclave was restored to atmospheric pressure, further 25 mg of palladium acetate as the hydrogenation catalyst was added by dissolving in 60 ml water added with 4 times mol of nitric acid A with respect to Pd. The inside of the system was carried out with substitution by hydrogen gas for twice, and the content of the autoclave was heated to 50° C. while the pressure was applied to 3 MPa by hydrogen gas, then the hydrogenation was carried out for 6 hours (referred as "the second step of the hydrogenation").

Then, the content was restored to ambient temperature and the system was made to nitrogen atmosphere, then the aqueous dispersion of the binder for the porous membrane having the iodine value 7 was obtained by condensing until it reaches the solid portion concentration of 40% using the evaporator. The dried body was obtained by the method as same as the above mentioned "measurement of the iodine value" from the aqueous dispersion of the binder for the porous membrane. When the NMR analysis was carried out, the nitrile group with respect to the entire amount of the polymer was 17 wt %, the linear alkylene structural unit hydrogenated with the polymer unit derived from the conjugated monomer of carbon atoms of 4 was 4.1 wt %, and carboxylic acid group was 2.6 wt %.

<1-6. The Production of the Slurry for the Porous Membrane>

By using carboxymethylcellulose as the thickener wherein the degree of etherification is 0.8 to 1.0, and viscosity of 1% aqueous solution was 10 to 20 mPa·s, 1% aqueous solution was prepared.

The aqueous dispersion of the non-conductive particle obtained in step <1-3>, the aqueous dispersion of binder for the porous membrane obtained in step <1-5> and the 1% aqueous solution of carboxymethylcellulose were mixed in the water so that the weight ratio of the solid portion is 83.1:6.15:4.6; then water was further added as the solvent and dispersed using the beads mill, thereby the slurry for the porous membrane was obtained. Note that, the content of the source material in the slurry other than water (the total of the solid portion) was made to be 50 wt %.

<1-7. The Production of the Positive Electrode>

To 95 parts of lithium manganite having the spinel structure as the positive electrode active material, 3 parts in terms of the solid portion of PVDF (polyvinylydene fluoride, the product name: KF-1100 made by KUREHA CORPORATION) as the binder was added; and 2 parts of acetylene black and 20 parts of N-methylpyrrolidone were added; then these were mixed by the planetary mixer, thereby the positive electrode composition in the slurry form was obtained. This positive electrode composition was coated on one side of the aluminum foil having the thickness of 18 μm, then after drying for 3 hours at 120° C., it was roll pressed; thereby obtained the positive electrode having the positive electrode active material layer with the thickness of 100 μm.

<1-8. The Production of the Negative Electrode>

98 parts of graphite having the particle size of 20 μm and the specific area of 4.2 m²/g as the negative electrode active material and 1 part in terms of the solid portion of SBR (styrene-butadiene rubber, the glass transition temperature: −10° C.) as the binder were mixed; then to this mixture, 1.0 part of carboxymethylcellulose was mixed, and water was further added as the solvent. Then, these were mixed by the planetary mixer; thereby the negative electrode composition in a slurry form was prepared. This negative electrode composition was coated on one side of the copper foil having the thickness of 18 μm, then after drying for 3 hours at 120° C., it was roll pressed thereby obtained the negative electrode having the negative electrode active material layer with the thickness of 60 μm.

<1-9. The Production of the Separator with the Porous Membrane>

The separator made of the single layer polypropylene of produced by the dry method (the porosity of 55%, and the thickness of 25 μm) was prepared as the organic separator layer. On the one side of this organic separator, the slurry for the porous membrane obtained in step (1-5) was coated using the wire bar so that the thickness after drying was 5 μm to obtain the slurry layer, then the slurry layer was dried for 10 minutes at 50° C., thereby the porous membrane was formed. Next, similarly, on the other side of the organic separator, the porous membrane was formed; thereby the separator with the porous membrane which comprises the porous membrane on the both sides was obtained.

<1-10. The Production of the Secondary Battery Comprising the Separator with the Porous Membrane>

The positive electrode obtained at step (1-7) was cut into a circular shape having a diameter of 13 mm thereby the circular positive electrode was obtained. The negative electrode obtained in step (1-8) was cut into a circular shape having a diameter of 14 mm, thereby the circular negative electrode was obtained. Also the separator with the porous membrane was cut into a circular shape having a diameter of 18 mm; thereby a circular separator with porous membrane having a 18 mm was obtained.

The circular positive electrode was placed at the bottom face of the coin shape outer container made of stainless steel provided with the polypropylene packing, and the circular separator with the porous membrane was placed thereon, then the circular negative electrode was further placed thereon; and these were placed in the container. The circular positive electrode placed so that the face of the aluminum foil side faced towards the bottom face of the outer container and the face of the positive electrode active material layer side faces upwards. The circular negative electrode was placed so that the face of the negative electrode active material layer side faces toward the separator with the porous membrane and the face of the copper foil side faces upward.

The electrolytic solution was introduced in the container so that no air remains therein, and the stainless steel cap having the thickness of 0.2 mm was placed over the outer container via the polypropylene packing then fixed to seal the battery can; thereby the lithium ion secondary battery (the coin cell CR2032) having the thickness of about 3.2 mm and a diameter of 20 mm was produced. As for the electrolytic solution, the solvent wherein $LiPF_6$ was dissolved in a concentration of 1 mol/litter in the mixed solvent which is the mixture of ethylenecarbonate (EC) and diethylcarbonate (DEC) of EC:DEC=1:2 (the capacity ratio at 20° C.) was used.

<1-11. The Evaluation>

The disperse stability obtained by step 1-6, the reliability, the powder falling property of the porous membrane of the separator with the porous membrane obtained by step 1-9, and the high temperature characteristic of the secondary battery obtained by step 1-10 were evaluated. The results are shown in Table 2.

The Example 2

2-1. The Production of the Negative Electrode with the Porous Membrane

To the face of the negative electrode active material layer of the negative electrode obtained by step (1-8) of the example 1, the slurry for the porous membrane obtained by step (1-6) of the example 1 was coated so that the negative electrode active material layer was completely covered and the thickness of the porous membrane after drying was 5 μm, thereby the slurry layer was obtained. The slurry layer was dried for 10 minutes at 50° C. to form the porous membrane; thereby the negative electrode with the porous membrane was obtained. The obtained negative electrode with the porous membrane had a layer constitution of (the porous membrane)/(the negative electrode active material layer)/(the copper foil).

2-2. The Production of the Secondary Battery or so

The procedures as same as the steps of the example 1 were carried out and the secondary battery was obtained, except for changing the following points.

In the production of the battery of step (1-10), instead of the separator with the porous membrane, the organic separator layer (the single layer polypropylene separator, the porosity of 55%, the thickness of 25 μm, the same organic separator used in step (1-9) of the example 1) was used as the separator.

In the production step of the battery of step (1-10), instead of the negative electrode, the negative electrode with the porous membrane obtained by the above mentioned step (2-1) was used. Upon placing the circular negative electrode with the porous membrane, it was placed so that the face of the porous membrane side thereof faces the circular separator side, and the face of the copper foil side faces upwards.

The Example 3

The procedures as same as the example 1 were carried out except for using the alumina particle (alumina AKP-50 made by Sumitomo Chemical Co., Ltd, the average particle size 0.3 μm) for the non-conductive particle.

The Examples 4, 5

The procedures were carried out as same as the example 1, except for using the amount of palladium acetate shown in Table 1 at "the first step of the hydrogenation reaction" and "the second step of the hydrogenation" during step 1-5.

The Examples 6 to 13

The procedures as same as the example 1 were carried out except for changing the type and the amount of the monomer used in step 1-4 to those which are shown in Table 1.

The Comparative Example 1

The procedures as same as the example 1 were carried out except for setting the amount of palladium acetate which is added at "the first step of the hydrogenation reaction" of the step 1-5 to 50 mg, and that the second step of the hydrogenation reaction was not carried out.

The Comparative Examples 2 to 4

The procedures as same as the example 1 were carried out except for changing the composition of the monomer to those shown in Table 1 which is used in step 1-4.

The Comparative Example 5

5-1. The Preparation of the Binder B

Into the reaction machine with the stirrer, 70 parts of the ion exchange water, 0.2 parts of sodium dodecylbenzenesulfonate and 0.3 parts of potassium persulfate were supplied, and the vapor phase part was substituted using by the nitrogen gas, and the temperature was raised to 60 degrees. On the other hand, in a different container, 50 parts of the ion exchange water, 0.5 parts of sodium dodecylbenzene sulfonate, 93 parts of 2-ethylhexylacrylate as the polymerization monomer, 2 parts of acrylonitrile, and 5 parts of methacrylic acid were mixed; thereby the monomer mixture was obtained. Then, this monomer mixture was continuously added into said reaction machine over 4 hours to carry out the polymerization. During the addition, the reaction was carried out at 60° C. After the transformation was completed, it was further stirred for 3 hours at 70° C. and the reaction was completed. The polymerization transformation rate was 99%. The obtained polymerization solution was cooled to 25° C. then the aqueous ammonium was added to regulate the pH to 7, and the steam was introduced to remove the unreacted monomer thereby the binder B was obtained. (The Regulation of the Slurry for the Porous Membrane)

The procedures as same as the example 1 were carried out except for using the mixture having the solid portion ratio between the binder and the binder B of 1:1 of the comparative example 4 as the binder during the preparation of the slurry for the porous membrane.

The Comparative Example 6

The procedures as same as the example 1 were carried out except for using the two types mixed binder used in the comparative example 5 as the binder, and the alumina particle (alumina AKP-50 made by Sumitomo Chemical Co., Ltd, the average particle size 0.3 m) as the non-conductive fine particle.

The Comparative Example 7

The procedures as same as the example 2 were carried out except for using the binder used in the comparative example 1 as the binder.

TABLE 1

| | | The binder for the porous membrane | | | | | | | | | |
|---|---|---|---|---|---|---|---|---|---|---|---|
| | | Example 1 | Example 2 | Example 3 | Example 4 | Example 5 | Example 6 | Example 7 | Example 8 | Example 9 | Example 10 |
| Binder material | | | | | | | | | | | |
| Monomer | Acrylonitrile (AN) | 35 | 35 | 35 | 35 | 35 | 20 | 10 | 35 | 35 | 35 |
| | Butadiene (BD) | 60 | 60 | 60 | 60 | 60 | 75 | 85 | 64 | 50 | 60 |
| | Methacrylic acid | 5 | 5 | 5 | 5 | 5 | 5 | 5 | 1 | 15 | |
| | Maleic acid | | | | | | | | | | 5 |
| | Acrylamide-2-methylpropane sulfonate (AMPS) | | | | | | | | | | |
| | Phosphoric | | | | | | | | | | |

TABLE 1-continued

The binder for the porous membrane

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | acid-2-(meth)-acryloyloxyethtyl 2-hydroxyethylmethacrylate | | | | | | | | | | |
| | Hydrogenation condition | | | | | | | | | | |
| Added amount of the palladium acetate [mg] | First step | 75 | 75 | 75 | 90 | 100 | 75 | 75 | 75 | 75 | 75 |
| | Second step | 25 | 25 | 25 | 10 | なし | 25 | 25 | 25 | 25 | 25 |
| | Binder composition | | | | | | | | | | |
| Content ratio of the nitrile group (wt %) | | 17 | 17 | 17 | 17 | 17 | 10 | 5 | 17 | 17 | 17 |
| Type of the hydrophilic group | | Carboxylic acid | Carboxylic acid | Carboxylic acid | Carboxylic acid | Carboxylic acid | Carboxylic acid | Carboxylic acid | Carboxylic acid | Carboxylic acid | Carboxylic acid |
| Content ratio of the hydrophiolic group (wt %) | | 2.6 | 2.6 | 2.6 | 2.6 | 2.6 | 2.6 | 2.6 | 0.5 | 7.8 | 3.9 |
| Linear alkylene structual unit (wt %) | | 54.1 | 54.1 | 54.1 | 51.9 | 49.1 | 67.6 | 76.6 | 57.7 | 45.0 | 54.1 |
| Iodine value | | 7 | 7 | 7 | 15 | 27 | 7 | 7 | 7 | 7 | 7 |

| | | Example 11 | Example 12 | Example 13 | Comparative example 1 | Comparative example 2 | Comparative example 3 | Comparative example 4 | Comparative example 5 | Comparative example 6 |
|---|---|---|---|---|---|---|---|---|---|---|
| | Binder material | | | | | | | | | |
| Monomer | Acrylonitrile (AN) | 35 | 35 | 35 | 35 | 60 | 1.5 | 35 | 35 | 35 |
| | Butadiene (BD) | 60 | 60 | 60 | 60 | 35 | 93.5 | 65 | 65 | 65 |
| | Methacrylic acid | | | | 5 | 5 | 5 | 0 | 0 | 0 |
| | Maleic acid | | | | | | | | | |
| | Acrylamide-2-methylpropane sulfonate (AMPS) | 5 | | | | | | | | |
| | Phosphoric acid-2-(meth)-acryloyloxyethyl | | 5 | | | | | | | |
| | 2-hydroxyethylmethacrylate | | | 5 | | | | | | |
| | Hydrogenation | | | | | | | | | |
| Added amount of the palladium acetate [mg] | First step | 75 | 75 | 75 | 50 | 75 | 75 | 75 | 75 | 75 |
| | Second step | 25 | 25 | 25 | なし | 25 | 25 | 25 | 25 | 25 |
| Binder composition | | | | | | | | | *1 | *1 |
| Content ratio of the nitrile group (wt %) | | 17 | 17 | 17 | 17 | 29 | 0.7 | 17 | 17 | 17 |
| Type of the hydrophilic group | | Sulfonic acid | Phosphoric acid | Hydroxyle group | Carboxylic acid | Carboxylic acid | Carboxylic acid | NONE | NONE | NONE |

TABLE 1-continued

| | \multicolumn{10}{c}{The binder for the porous membrane} |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| Content ratio of the hydrophiolic group (wt %) | 2.0 | 2.3 | 0.7 | 2.6 | 2.6 | 2.6 | 0 | 0 | 0 | |
| Linear alkylene structual unit (wt %) | 59.1 | 54.1 | 54.1 | 43.7 | 31.5 | 84.2 | 58.6 | 58.6 | 58.6 | |
| Iodine value | 7 | 7 | 7 | 57 | 7 | 7 | 7 | 7 | 7 | |

*1: In addition to the polymer shown in Table, the copolymer of 93 parts of 2-ethylhexylacrylate, 2 parts of acrylonitrile, 5 parts of metacrylic acid were used in the same amount.

TABLE 2

Table 2: The evaluation of the slurry for the porous membrane and the porous membrane

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Solid portion composition of the slurry (wt %) | Non-conductive particle | Cross-linked polystyrene | Cross-linked polystyrene | Alumina | Cross-linked polystyrene | Cross-linked polystyrene | Cross-linked polystyrene | Cross-linked polystyrene | Cross-linked polystyrene | Cross-linked polystyrene | Cross-linked polystyrene |
| | Amount of the non-conductive particle | 83.1 | 83.1 | 83.1 | 83.1 | 83.1 | 83.1 | 83.1 | 83.1 | 83.1 | 83.1 |
| | Amount of the binder | 12.3 | 12.3 | 12.3 | 12.3 | 12.3 | 12.3 | 12.3 | 12.3 | 12.3 | 12.3 |
| Slurry dispersibility | | A | A | A | A | A | B | C | A | A | B |
| Substrate which the porous membrane was formed | | Separator | Electrode surface | Separator | Separator | Separator | Separator | Separator | Separator | Separator | Separator |
| Reliability test of the separator with the porous membrane | | A | — | A | A | B | A | B | C | C | A |
| Reliability test of the electrode with the porous membrane | | — | A | — | — | — | — | — | — | — | — |
| Separator with the porous membrane: Powder fall off property | | A | — | A | A | A | A | B | C | A | A |
| Electrode with the porous membrane: Powder fall off property | | — | A | — | — | — | — | — | — | — | — |
| High temperature characteristic of the secondary battery | | A | A | B | C | C | B | B | B | C | A |

| | | Example 11 | Example 12 | Example 13 | Comparative example 1 | Comparative example 2 | Comparative example 3 | Comparative example 4 | Comparative example 5 | Comparative example 6 |
|---|---|---|---|---|---|---|---|---|---|---|
| Solid portion composition of the slurry (wt %) | Non-conductive particle | Cross-linked polystyrene | Cross-linked polystyrene | Cross-linked polystyrene | Cross-linked polystyrene | Cross-linked polystyrene | Cross-linked polystyrene | Cross-linked polystyrene | Cross-linked polystyrene | Alumina |
| | Amount of the non-conductive Particle | 83.1 | 83.1 | 83.1 | 83.1 | 83.1 | 83.1 | 83.1 | 83.1 | 83.1 |
| | Amount of the binder | 12.3 | 12.3 | 12.3 | 12.3 | 12.3 | 12.3 | 12.3 | 12.3 | 12.3 |
| Slurry dispersibility | | B | B | B | A | B | E | B | D | D |
| Substrate which the porous membrane was formed | | Separator | Separator | Separator | Separator | Separator | Separator | Separator | Separator | Separator |
| Reliability test of the separator with the porous membrane | | A | B | B | C | C | D | B | C | C |
| Reliability test of the electrode with the porous membrane | | — | — | — | — | — | — | — | — | — |
| Separator with the porous membrane: Powder fall off property | | A | B | C | A | D | F | E | E | E |

TABLE 2-continued

Table 2: The evaluation of the slurry for the porous membrane and the porous membrane

| Electrode with the porous membrane: Powder fall off property | — | — | — | — | — | — | — | — | — |
|---|---|---|---|---|---|---|---|---|---|
| High temperature characteristic of the secondary battery | B | B | B | E | C | E | C | D | E |

According to the above, by using the binder defined in the present invention, the disperse stability of the slurry for the porous membrane is good, and the reliability of the separator comprising the obtained porous membrane and the electrode are improved, further the powder fall off is prevented as well. Further, by using said separator or the electrode, the cycle characteristic and the safety at the high temperature of the secondary battery is improved.

On the other hand, if the hydrogenation of the binder is insufficient and the iodine value is too high, particularly the high temperature characteristic of the secondary battery is significantly deteriorated (the comparative examples 1, 7). Also, when the content of the nitrile group is too high, the powder fall off property of the porous membrane is deteriorated (the comparative example 2); and on the other hand, when it is too little, the dispersibility of the slurry declines and the reliability of the obtained porous membrane and the powder fall off property are deteriorated, and the cycle characteristic is also deteriorated (the comparative example 3). Further, regarding the binder which does not include the hydrophilic group, the powder fall off property deteriorates (the comparative example 4). Also, in case the polymer comprising the nitrile group and the polymer comprising the hydrophilic group are combined, the dispersibility of the slurry declines, thus the powder fall off property and the cycle characteristic of the obtained porous membrane are deteriorated (the comparative examples 5 and 6).

Further, by using the plate shape non-conductive particle or the scale shape non-conductive particle, the slurry, the porous membrane and the secondary battery were produced. Note that, in the following experiments, except for evaluating (the flexibility and the powder falloff), (the heat shrink test) and (the average particle size and the aspect ratio of the non-conductive particle) as following, the same evaluation method and the evaluation standard as same as the above were employed.

<The Flexibility and the Powder Fall Off Property>

The electrode of which the porous membrane was formed on the active material layer, or the organic separator formed with the porous membrane was cut into a rectangular parallelepiped shape of width 1 cm×length 5 cm to form the test sample. The test sample was placed on the table facing the face of the current collector side down, then at the center of the length direction (the position at 2.5 cm from the end), the stainless steel rod of the diameter of 1 mm was placed in the short direction at the face of the current collector side. The test sample was bended over 180 degrees taking this stainless steel at the center and so that the porous membrane layer is facing outside. 10 test samples were tested, and for each sample, the part where the porous membrane was bended was observed for the presence of the crack or the powder fall off based on the following standard. The lesser the crack or the powder fall off are, the more excellent the active material layer or the porous membrane formed on the organic separator are in regards the flexibility and the powder fall off property.

A: None of the test samples show the crack or the powder fall off.

B: 1 to 2 out of 10 test samples show the cracks or the powder fall off.

C: 3 to 5 out of 10 test samples show the cracks or the powder fall off.

D: 6 to 7 out of 10 test samples show the cracks or the powder fall off.

E: 8 to 9 out of 10 test samples show the cracks or the powder fall off.

F: All of the test samples show the crack or the powder fall off.

<The Heat Shrinking Test>

After cutting the separator with the porous membrane into 5 cm square, and left for 1 hour in the thermostat chamber at the predetermined temperature. After 1 hour, the separator with the porous membrane was taken out from the thermostat chamber, and the area thereof was measured. The value calculated in a percentage of the ratio of the shrink was defined as the heat shrinking rate and evaluated in the following standard. The smaller the value is, the more excellent the heat resistance is; and also even at further higher temperature, the smaller the shrinking rate is, the more excellent it is.

A: The shrinking rate less than 1 at 160° C.
B: The shrinking rate less than 1% at 150° C.
C: The shrinking rate 1% or more and less than 10% at 150° C.
D: The shrinking rate of 10% or more at 150° C.

<The Average Particle Size and the Aspect Ratio of the Non-Conductive Particle>

The photograph of the non-conductive particle was taken using the high resolution field emission scanning electron microscope (S-4700 made by Hitachi High-Technologies Corporation), and form the arbitrary filed thereof, 50 particles were selected arbitrary, and the image analysis was carried out; then the average primary diameter of the non-conductive particle was obtained as the average value of the circular equivalent.

Also, the aspect ratio was similarly obtained as the average value by carrying out the image analysis by selecting 50 particles from SEM photograph. Specifically, 50 particles were selected from the large non-conductive particle of which the entire image can be observed at 100× magnification, then for each of those, it was observed under 1000× magnification. Then, directly from the printed photograph, the average value of the short axis, the long axis and the aspect ratio of the non-conductive particle were obtained.

The Example 14

The procedures as same as the example 1 were carried out except for using the scale shape boehmite having the average particle size of 5 μm and the aspect ratio of 50 (the ratio of the particle in the range of the aspect ratio of 3 to 100 is 50% or more of the entire particles in the number base) instead of the aqueous dispersion of the non-conductive particle obtained at the step <1-3> in the <1-6. The production of the slurry for the porous membrane> of the example 1. The results are shown in Table 4.

The Example 15

The procedures as same as the example 2 were carried out except for using the slurry for the porous membrane obtained in the example 14 as the slurry of the porous membrane in the example 2. The results are shown in Table 4.

The Example 16

The procedures as same as the example 14 were carried out except for using the plate shape boehmite having the average diameter of 1 μm and the aspect ratio of 10 (the ratio of the particle in the range of the aspect ratio of 3 to 100 is 50% or more of the entire particles in the number base) as the non-conductive particle. The results are shown in Table 4.

The Comparative Example 8

The procedures as same as the example 1 was carried out except for the amount of palladium acetate added was 50 mg during "the first step of the hydrogenation reaction" in the example 14, and not carrying out the second step of the hydrogenation reaction. The results are shown in Table 4.

The Comparative Example 9

The procedures as same as the example 15 were carried out except for using the binder used in the comparative example 8 as the binder. The results are shown in Table 4.

The Comparative Example 10

The procedures as same as the example 14 were carried out except for changing the composition of the monomer used in step 1-4 to those shown in Table 3. The results are shown in Table 4.

TABLE 3

Table 3: The binder for the porous membrane

| | | Example 14 | Example 15 | Example 16 | Comparative example 8 | Comparative example 9 | Comparative example 10 |
|---|---|---|---|---|---|---|---|
| Binder material | | | | | | | |
| Monomer | Acrylonitrile (AN) | 35 | 35 | 35 | 35 | 35 | 35 |
| | Butadiene (BD) | 60 | 60 | 60 | 60 | 60 | 65 |
| | Methacrylic acid | 5 | 5 | 5 | 5 | 5 | 0 |
| | Maleic acid | | | | | | |
| | Acrylamide-2-methylpropane sulfonate (AMPS) | | | | | | |
| | Phosphoric acid-2-(meth)acryloyloxyethtyl 2-hydroxyethyl-methacrylate | | | | | | |
| | Hydrogenation | | | | | | |
| Added amount of the palladium acetate [mg] | First step | 75 | 75 | 75 | 50 | 50 | 75 |
| | Second step | 25 | 25 | 25 | なし | なし | 25 |
| Binder composition | | | | | | | |
| Content ratio of the nitrile group (wt %) | | 17 | 17 | 17 | 17 | 17 | 17 |
| Type of the hydrophilic group | | Carboxylic acid | Carboxylic acid | Carboxylic acid | Carboxylic acid | Carboxylic acid | None |
| Content ratio of the hydrophilic group (wt %) | | 2.6 | 2.6 | 2.6 | 2.6 | 2.6 | 0 |
| Linear alkylene structual unit (wt %) | | 54.1 | 54.1 | 54.1 | 43.7 | 43.7 | 58.6 |
| Iodine value | | 7 | 7 | 7 | 57 | 57 | 7 |

TABLE 4

Table 4:

| | | Example 1 | Example 2 | Example 3 | Comparative Example 8 | Comparative Example 9 | Comparative Example 10 |
|---|---|---|---|---|---|---|---|
| Non-conductive particle | Types | Scale shape boehmite | Scale shape boehmite | Plate shape boehmite | Scale shape boehmite | Scale shape boehmite | Scale shape boehmite |
| | Average particle diameter (μm) | 5 | 5 | 1 | 5 | 5 | 5 |
| | Aspect ratio | 50 | 50 | 10 | 50 | 50 | 50 |
| Solid portion composition of the slurry (wt %) | Amount of the non-conductive particle | 83.1 | 83.1 | 83.1 | 83.1 | 83.1 | 83.1 |
| | Amount of the binder | 12.3 | 12.3 | 12.3 | 12.3 | 12.3 | 12.3 |

TABLE 4-continued

Table 4:

|  | Example 1 | Example 2 | Example 3 | Comparative Example 8 | Comparative Example 9 | Comparative Example 10 |
|---|---|---|---|---|---|---|
| Slurry dispersibility | A | A | A | A | A | B |
| Substrate which the porous membrane was formed | Separator | Electrode surface | Separator | Separator | Electrode surface | Separator |
| Reliability test of the separator with the porous membrane | A | — | A | C | — | B |
| Reliability test of the electrode with the porous membrane | — | A | — | — | B | — |
| Flexibility and powder fall off property of the porous membrane | A | A | B | A | A | E |
| High temperature characteristic of the secondary battery | A | A | A | E | E | C |
| Heat shriking test | A | — | A | A | — | B |

According to the above, by using the binder defined in the present invention, the disperse stability of the slurry for the porous membrane is good, and the reliability of the separator comprising the obtained porous membrane and the electrode are improved, further the powder fall off is prevented as well. Further, by using said separator or the electrode, the cycle characteristic and the safety at the high temperature of the secondary battery is improved.

On the other hand, if the hydrogenation of the binder is insufficient and the iodine value is too high, particularly, the high temperature characteristic of the secondary battery is deteriorated (the comparative examples 8 and 9). Further, when the binder does not comprise the hydrophilic group, the adhesiveness is low, and the reliability of the porous membrane is deteriorated (the comparative example 10).

The invention claimed is:

1. A secondary battery porous membrane comprising a non-conductive particle and a binder; wherein
    said binder comprises a polymer including a nitrile group, a hydrophilic group and a linear alkylene structural unit having carbon atoms of 4 or more in a same molecule,
    a content ratio of said nitrile group in the polymer constituting said binder is 1 to 25 wt % and an iodine value of said polymer is 0 mg/100 mg or more and 30 mg/100 mg or less, and
    a content ratio of said hydrophilic group in the polymer constituting said binder is 1 to 6 wt %.

2. The secondary battery porous membrane as set forth in claim 1, wherein a content ratio of said linear alkylene structural unit in the polymer constituting said binder is 50 to 98 wt %.

3. The secondary battery porous membrane as set forth in claim 1, wherein the polymer constituting said binder is hydrogenated acrylonitrile.butadiene copolymer.

4. The secondary battery porous membrane as set forth in claim 1, wherein said hydrophilic group is selected from the group consisting of a carboxylic acid group, a sulfonic acid group, a phosphoric acid group, hydroxyl group and salts thereof.

5. The secondary battery porous membrane as set forth in claim 1, wherein a content ratio of said non-conductive particle in a total amount of a solid portion constituting said porous membrane is 70 to 97 wt %, and a content ratio of said binder is 0.5 to 15 wt %.

6. The secondary battery porous membrane as set forth in claim 1, wherein an average particle size of said non-conductive particle is 0.1 to 20 μm, and a ratio of particles in terms of number within a range of an aspect ratio between 3 to 100 is 50% or more.

7. An electrode for a secondary battery wherein an electrode active material layer including a binder for an electrode mixed layer and electrode active materials is formed by adhering to a current collector, and a surface of the electrode active layer is formed by stacking the porous membrane set forth in claim 1.

8. A separator for a secondary battery wherein said porous membrane set forth in claim 1 is stacked on an organic separator.

9. A secondary battery including a positive electrode, a negative electrode, a separator and an electrolytic solution wherein at least one of said positive electrode, said negative electrode and the separator is stacked with the porous membrane set forth in claim 1.

10. The secondary battery porous membrane as set forth in claim 2, wherein the polymer constituting said binder is hydrogenated acrylonitrile.butadiene copolymer.

11. The secondary battery porous membrane as set forth in claim 2, wherein said hydrophilic group is selected from the group consisting of a carboxylic acid group, a sulfonic acid group, a phosphoric acid group, hydroxyl group and salts thereof.

12. The secondary battery porous membrane as set forth in claim 3, wherein said hydrophilic group is selected from the group consisting of a carboxylic acid group, a sulfonic acid group, a phosphoric acid group, hydroxyl group and salts thereof.

13. The secondary battery porous membrane as set forth in claim 2, wherein a content ratio of said non-conductive particle in a total amount of a solid portion constituting said porous membrane is 70 to 97 wt %, and a content ratio of said binder is 0.5 to 15 wt %.

14. A slurry for the secondary battery porous membrane comprising a non-conductive particle, a binder and a dispersion medium; wherein
    said binder comprises a polymer including a nitrile group, a hydrophilic group and a linear alkylene structural unit having carbon atoms of 4 or more in a same molecule,
    a content ratio of said nitrile group in the polymer constituting said binder is 1 to 25 wt % and an iodine value of said polymer is 0 mg/100 mg or more and 30 mg/100 mg or less, and
    a content ratio of said hydrophilic group in the polymer constituting said binder is 1 to 6 wt %.

15. A production method of the secondary battery porous membrane comprising a step of coating the slurry for the porous membrane set forth in claim 14 to a substrate, and a step of drying.

* * * * *